United States Patent
Burgess et al.

(10) Patent No.: US 9,580,173 B1
(45) Date of Patent: Feb. 28, 2017

(54) TRANSLATIONAL CORRECTION OF PAYLOAD-RELEASE DEVICE BASED ON TRACKED POSITION

(71) Applicant: Google Inc., Mountain View, CA (US)

(72) Inventors: James Ryan Burgess, Redwood City, CA (US); Joanna Cohen, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 150 days.

(21) Appl. No.: 14/584,195

(22) Filed: Dec. 29, 2014

Related U.S. Application Data

(60) Provisional application No. 62/043,399, filed on Aug. 28, 2014.

(51) Int. Cl.
  *B64D 1/12* (2006.01)
  *B64C 39/02* (2006.01)

(52) U.S. Cl.
  CPC .............. *B64D 1/12* (2013.01); *B64C 39/024* (2013.01); *B64C 2201/128* (2013.01)

(58) Field of Classification Search
  CPC .... B64D 1/12; B64C 39/024; B64C 2201/128
  See application file for complete search history.

(56) References Cited

U.S. PATENT DOCUMENTS

| | | | | |
|---|---|---|---|---|
| 3,113,751 A | * | 12/1963 | Cotton | B64D 1/02 244/137.3 |
| 3,128,068 A | * | 4/1964 | Pauli | B64C 1/1415 160/212 |
| 3,612,448 A | * | 10/1971 | Frieder | B64D 1/02 244/138 R |
| 4,881,601 A | * | 11/1989 | Smith | B64D 1/16 169/53 |
| 6,086,015 A | * | 7/2000 | MacCready, Jr. | B64C 29/02 244/137.1 |
| 9,061,764 B2 | * | 6/2015 | Riley | B64D 1/08 |
| 9,085,362 B1 | * | 7/2015 | Kilian | B64F 1/02 |
| 9,174,733 B1 | * | 11/2015 | Burgess | B64D 1/12 |
| 2004/0084567 A1 | * | 5/2004 | Bailey | B64D 17/34 244/152 |
| 2011/0192938 A1 | * | 8/2011 | DiMarzio | B64B 1/00 244/53 R |
| 2012/0091261 A1 | | 4/2012 | Lee | |

(Continued)

*Primary Examiner* — Valentina Xavier
(74) *Attorney, Agent, or Firm* — McDonnell Boehnen Hulbert & Berghoff LLP

(57) ABSTRACT

An unmanned aerial vehicle (UAV) is disclosed that includes a retractable payload delivery system. The payload delivery system can lower a payload to the ground using a delivery device that secures the payload during descent and releases the payload upon reaching the ground. The location of the delivery device can be determined as it is lowered to the ground using image tracking. The UAV can include an imaging system that captures image data of the suspended delivery device and identifies image coordinates of the delivery device, and the image coordinates can then be mapped to a location. The UAV may also be configured to account for any deviations from a planned path of descent in real time to effect accurate delivery locations of released payloads.

20 Claims, 20 Drawing Sheets

(56) References Cited

U.S. PATENT DOCUMENTS

| | | | |
|---|---|---|---|
| 2012/0228432 A1* | 9/2012 | Fox, Jr. .................... | B64D 1/08 244/137.3 |
| 2012/0303261 A1* | 11/2012 | Bernhardt ................ | B64D 1/08 701/409 |
| 2015/0317597 A1* | 11/2015 | Shucker ............... | G06Q 10/083 235/375 |

* cited by examiner

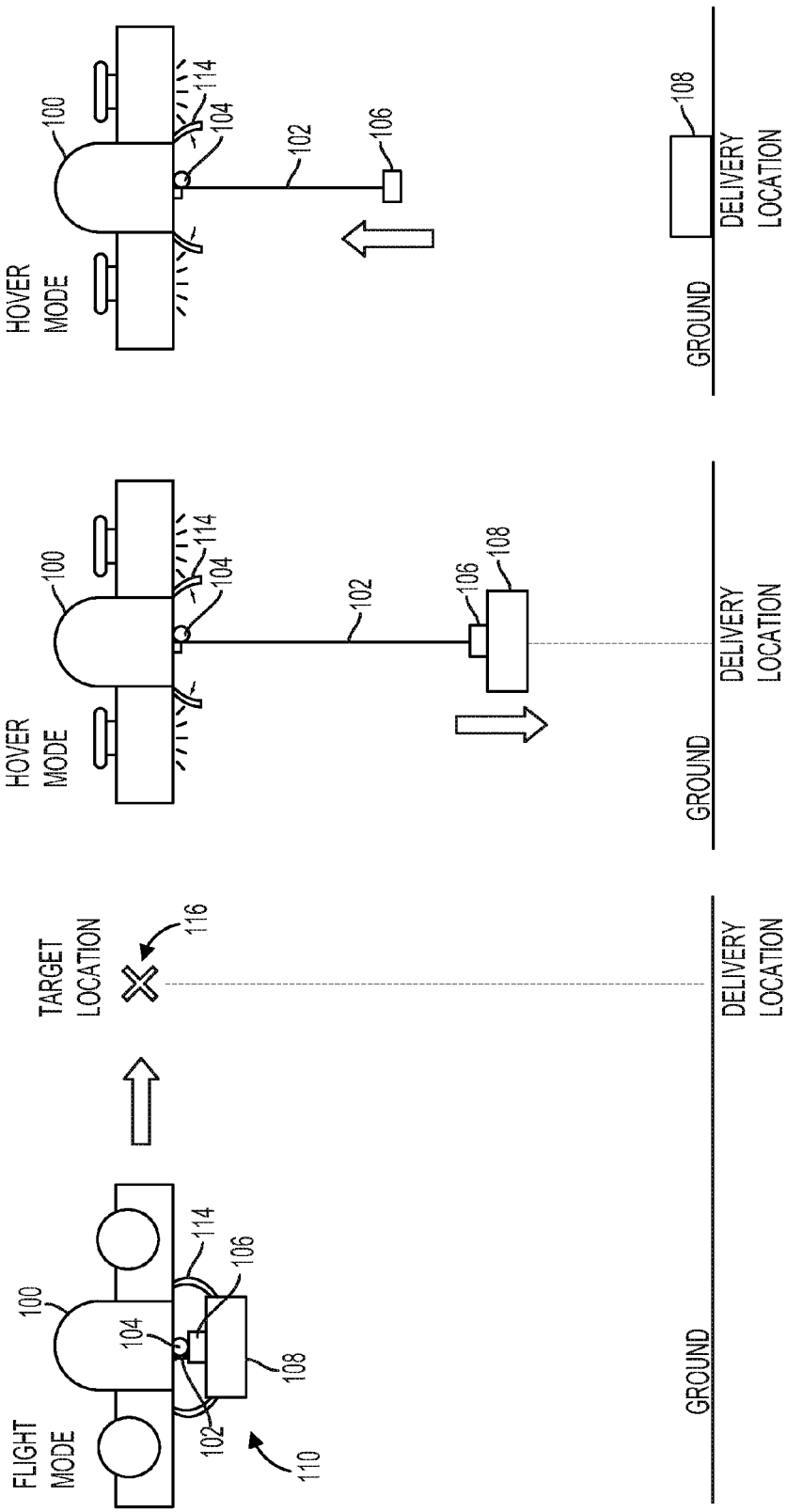

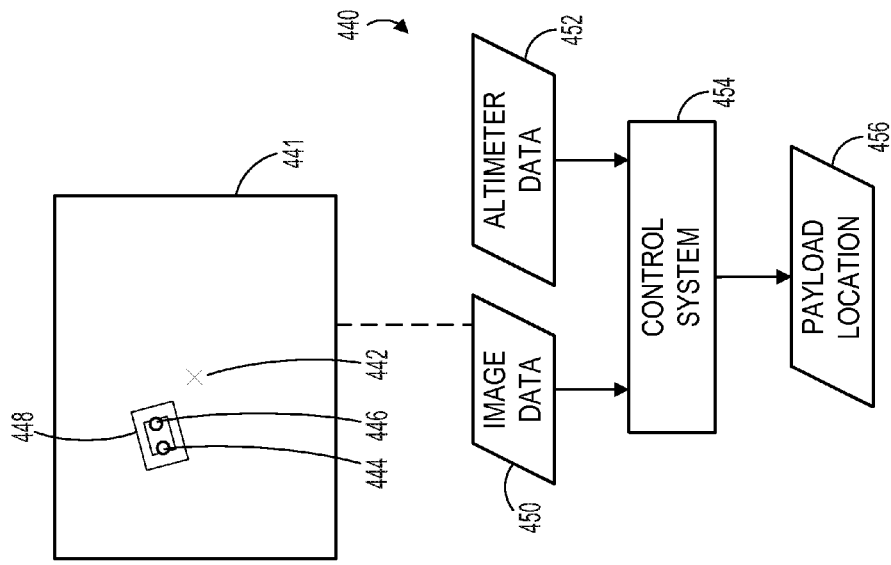
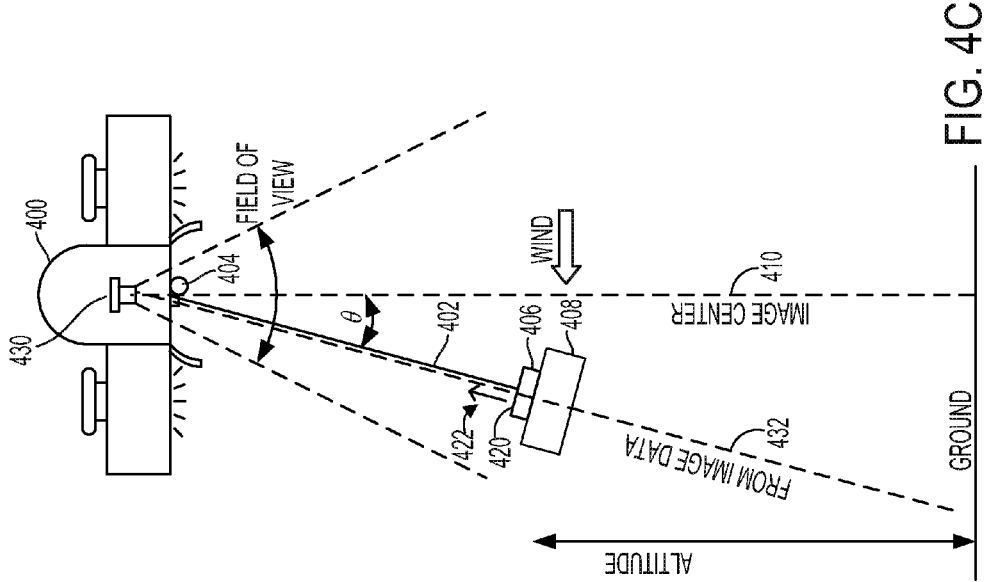
FIG. 4D
FIG. 4C

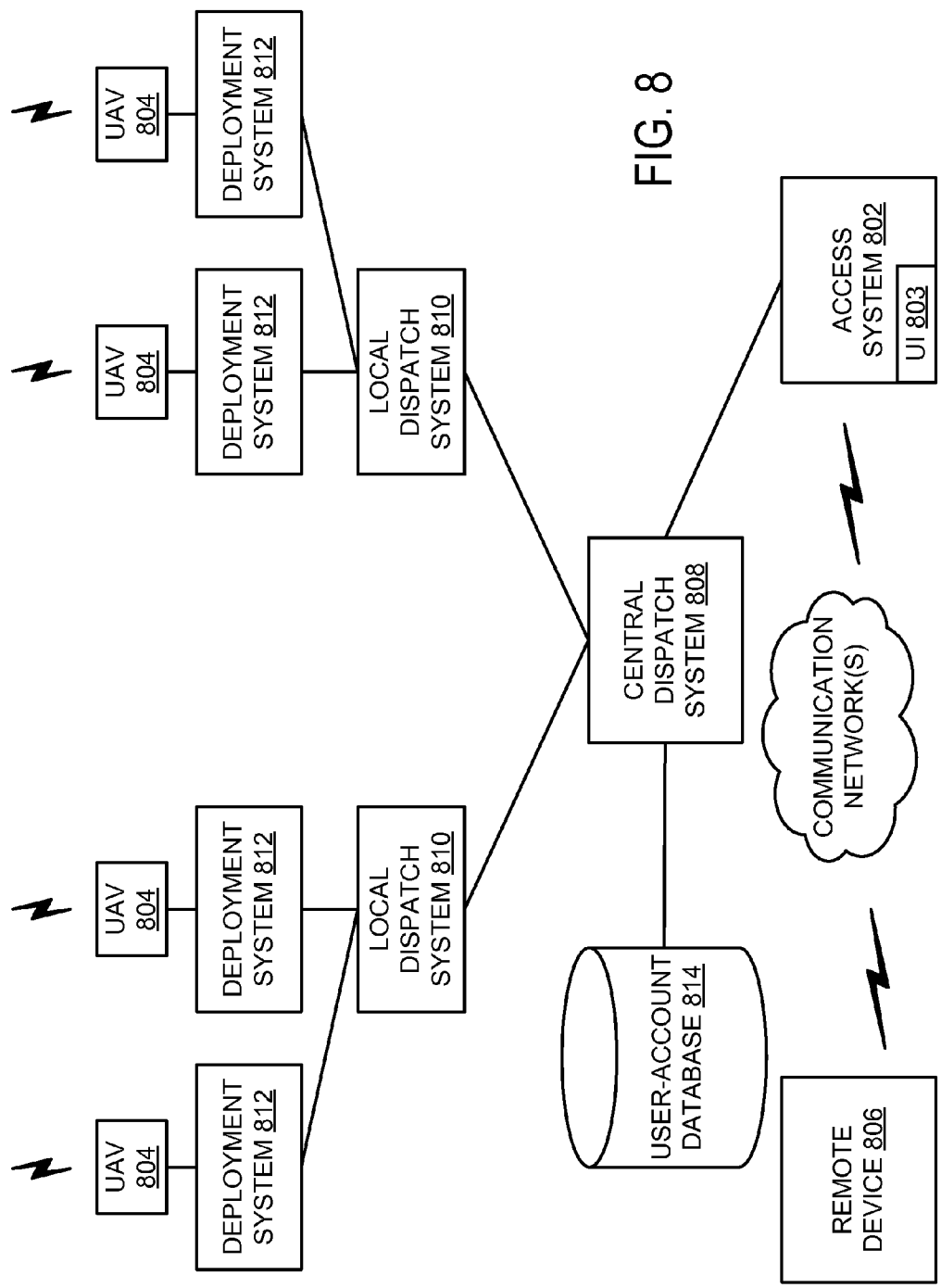

TRANSLATIONAL CORRECTION OF PAYLOAD-RELEASE DEVICE BASED ON TRACKED POSITION

CROSS-REFERENCE TO RELATED APPLICATIONS

This application claims priority to U.S. Provisional Patent Application No. 62/043,399, filed Aug. 28, 2014, which is incorporated herein by reference in its entirety and for all purposes.

BACKGROUND

Unless otherwise indicated herein, the materials described in this section are not prior art to the claims in this application and are not admitted to be prior art by inclusion in this section.

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land.

SUMMARY

An unmanned aerial vehicle (UAV) is disclosed that includes a retractable payload delivery system. The payload delivery system can lower a payload to the ground using a delivery device that secures the payload during descent and releases the payload upon reaching the ground. The location of the delivery device (also referred to herein as a delivery system or payload release device) can be determined as it is lowered to the ground using image tracking. The UAV can include an imaging system that captures image data of the suspended delivery device and identifies image coordinates of the delivery device, and the image coordinates can then be mapped to a location. The UAV may also be configured to account for any deviations from a planned path of descent in real time to effect accurate delivery locations of released payloads.

In one aspect, an example system may include a retractable delivery system, an air propulsion system, and a control system. The retractable delivery system can include a delivery device configured to be releasably coupled to a payload, a tether coupled to an unmanned aerial vehicle (UAV) and the delivery device, and a retraction system coupled to the tether and operable to use the tether to lower the device and the payload secured thereby from the UAV. The air propulsion system can be situated on the delivery device. The air propulsion system can be configured to, while the delivery device is suspended from the UAV via the tether, generate force on the delivery device in a direction at least partially transverse to a direction of the tether near the delivery device. The control system can be configured to: (i) while the delivery device is suspended from the UAV via the tether, determine a position of the delivery device with respect to a path of descent associated with a delivery location; (ii) determine a movement to be performed by the delivery device so as to move the delivery device closer to the path of descent; and (iii) use the air propulsion system to cause the delivery device to perform the determined movement.

In another aspect, an example method may include determining a position of the delivery device with respect to a path of descent associated with a delivery location while a delivery device is suspended from an unmanned aerial vehicle (UAV) via a tether. The example method may also include determining a movement to be performed by the delivery device so as to move the delivery device closer to the path of descent. The example method may also include using an air propulsion system to cause the delivery device to perform the determined movement. The air propulsion system can be situated on the delivery device.

In another aspect, an example delivery device may include a housing, an electromechanical component, an air propulsion system, and a control system. The housing can include a tether anchor configured to couple the housing to a tether operable to suspend the housing via the tether. The electromechanical component can be mounted to the housing. The electromechanical component can be configured to be positioned in a first position in which the electromechanical component engages a payload so as to secure the payload to the housing, and a second position in which the electromechanical component does not engage the payload. The air propulsion system can be mounted to the housing. The air propulsion system can be configured to generate force on the delivery device in a direction at least partially transverse to a direction of the tether near the delivery device while the delivery device is suspended from the UAV via the tether. The control system can be configured to: (i) while the delivery device is suspended from the UAV via the tether, determine a position of the delivery device with respect to a path of descent associated with a delivery location; (ii) determine a movement to be performed by the delivery device so as to move the delivery device closer to the path of descent; and (iii) use the air propulsion system to cause the delivery device to perform the determined movement.

In another aspect, a non-transitory computer readable medium has stored therein instructions executable by a computing device to cause the computing device to perform operations. The operations may include determining a position of the delivery device with respect to a path of descent associated with a delivery location while a delivery device is suspended from an unmanned aerial vehicle (UAV) via a tether. The operations may include determining a movement to be performed by the delivery device so as to move the delivery device closer to the path of descent. The operations may include using an air propulsion system to cause the delivery device to perform the determined movement. The air propulsion system can be situated on the delivery device.

In yet another aspect, example systems may include means for determining a position of the delivery device with respect to a path of descent associated with a delivery location while a delivery device is suspended from an unmanned aerial vehicle (UAV) via a tether. Example systems may also include means for determining a movement to be performed by the delivery device so as to move the delivery device closer to the path of descent. Example systems may also include means for using an air propulsion system to cause the delivery device to perform the determined movement.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 1A, 1B, and 1C show a UAV that includes a payload delivery system, according to an example embodiment.

FIGS. 4A, 4B, and 4C illustrate stages of a delivery operation in which a location of the descending payload-release device is determined, according to example embodiments.

FIG. 4D illustrates an example system for determining a location of a descending payload-release device, according to an example embodiment.

FIG. 8 is a simplified block diagram illustrating a distributed UAV system, according to an example embodiment.

DETAILED DESCRIPTION

Figure 1D:
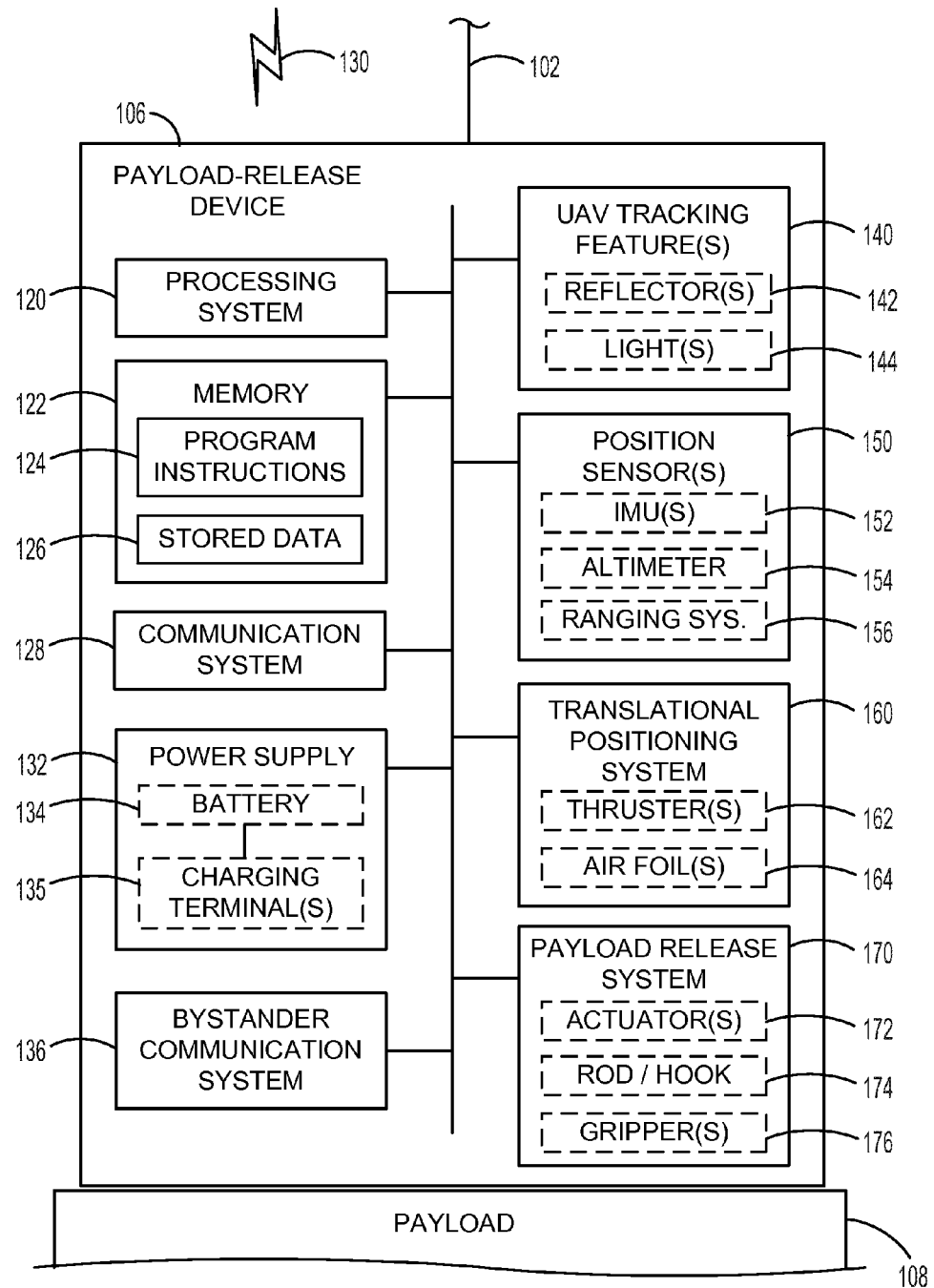
FIG. 1D is a simplified block diagram of an example payload-release device, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example embodiments may relate to and/or be implemented in a system in which unmanned vehicles, and in particular, "unmanned aerial vehicles" (UAVs), are configured to deliver payloads at delivery locations. UAVs in such a system may operate in an autonomous or semi-autonomous delivery system in which the UAV carries a payload from a first location, such as a distribution center, to a delivery location, such as a residence or business. At the distribution center, the UAV can be loaded with the payload to be delivered, and then the UAV can navigate to the delivery location. The UAV can then transition to a hover mode while situated above the delivery location.

While hovering, the UAV can autonomously deliver the payload using a retractable delivery system that lowers the payload to the ground while the UAV hovers above. The payload-release device is an apparatus that functions to secure a payload during descent from a hovering UAV, and then release the payload on the ground, among other functions described herein. The payload-release device is alternately referred to herein as a delivery device. A winch can unreel and reel in the tether to lower and raise the payload-release device. The payload-release device can be configured to secure the payload while being lowered from the UAV by the tether and release the payload upon reaching ground level. The payload can then be retracted to the UAV by reeling in the tether using the winch. The payload-release device can also include sensors such as a barometric pressure based altimeter and/or accelerometers to assist in detecting the position of the payload-release device (and the payload) relative to the ground. Data from the sensors can be communicated back to the UAV and/or a control system over a wireless link and used to help in determining when the payload-release device has reached ground level (e.g., by detecting a measurement with the accelerometer that is characteristic of ground impact).

The payload-release device can be secured to the payload in a variety of ways. In some examples, the payload includes a payload mount attachment on its top surface. The payload mount attachment can be a loop extending from the top surface, a hook, or a structure with an aperture. The payload-release device can include a channel into which the payload mount attachment can be inserted. The payload-release device can also include a retaining rod or hook that can be positioned to engage the payload mount attachment and release the payload mount attachment. The retaining rod can be configured to be positioned in: (i) an engaged position, in which the retaining rod intersects two planes defined by respective sidewalls of the channel, and (ii) a disengaged position, in which the retaining rod does not intersect either plane. For example, in the engaged position, the retaining rod can cross the channel such that the rod engages a rim of the payload mount attachment inserted in the channel. In the disengaged position, the retaining rod can be withdrawn from the channel such that the rod does not interfere with the payload mount attachment exiting the channel. Thus, in the disengaged position, the retaining rod does not engage the payload mount attachment.

Additionally, or alternatively, the payload-release device may include claws and/or gripping members that selectively open and close to grasp the payload and secure the payload by static friction. The payload-release device may include hooks or bars configured to engage handles or apertures in the payload. Further, the payload may be equipped with one or more retaining pins or bumps that engage corresponding grooves in gripping members that can be actuated to move closer together (and thereby secure the payload by engaging the pins) or move apart (and thereby release the payload). In some cases, the payload-release device may be a vessel with a trap door on bottom that is closed to secure the payload within, and selectively opened to release the payload. The payload-release device can use a variety of other techniques to selectively secure and release payloads.

The payload-release device can include a light source on a top side that faces the UAV as the payload-release device is suspended from the UAV. While the payload-release device descends from the UAV, light is emitted upward from the light source to the UAV. An imaging system on the UAV can then be used to track the location of the descending device by detecting the upward-directed light and tracking the pixel location of the detected light. The imaging system can also compensate for any motion of the UAV itself and determine the relative translational offset of the descending device, if any. To reduce the effect of interference, the light source may emit IR and may be operated with a particular amplitude modulation pattern to allow the imaging system to distinguish from other sources of IR. In another example, the payload-release device may have multiple LEDs that emit light in different colors to thereby make the detected light from the pattern of two or more multi-colored LEDs more distinguishable from background sources of light in different environments.

The position of the payload-release device (egg) with respect to a target delivery location can be determined based on any combination of: image tracking from the UAV, inertial sensors on the UAV, GPS, etc. Translational offsets of the descending payload-release device (e.g., due to wind) with respect to the target delivery location, as determined in real time, can be compensated for by corresponding translational motion of the UAV and/or by operating thrusters on the descending device itself. In some examples, upon detecting a drift in the descending payload due to wind, the UAV can move parallel to the ground such that the payload still lands in the intended delivery location. In some examples, the payload-release device can generate thrust, independent of the UAV, to compensate for wind or other translational forces as the payload descends from the UAV.

To move the payload-release device independent of the UAV, the payload-release device may have fans or other thrusters mounted to the housing of the payload-release device. For instance, there may be an arrangement of two reversible fans oriented such that their respective directions of thrust (e.g., axes of rotation) are roughly transverse to one another and to the line connected to the UAV. Spinning the two fans in respective directions at respective speeds can thereby produce a translational thrust perpendicular to the direction of tether tension. In some cases, the payload release device may additionally or alternatively include airfoils (e.g., fins, wings, flaps) that can be actuated to different positions to create a force on the payload via interaction with the surrounding air.

II. Example System for Delivering a Payload from a Hovering UAV

FIGS. 1A, 1B, and 1C show a UAV 100 that includes a payload delivery system 110, according to an example embodiment. As shown, payload delivery system 110 for UAV 100 includes a tether 102, a tether-deployment mechanism 104, and a payload-release device 106 coupled to the tether 102. The payload-release device 106 can function to alternately secure a payload 108 and release the payload 108 upon delivery. The tether-deployment mechanism 104 can function to unreel and retract the tether 102 such that the payload-release device 106 can be lowered to the ground and retracted back to the UAV 100. The payload 108 may itself be an item for delivery, and may be housed within (or otherwise incorporate) a parcel, container, or other structure that is configured to interface with the payload-release device 106. In practice, the payload delivery system 110 of UAV 100 may function to autonomously lower payload 108 to the ground in a controlled manner to facilitate delivery of the payload 108 on the ground while the UAV 100 hovers above.

As shown in FIG. 1A, the payload delivery system 110 may function to hold the payload 108 against or close to the bottom of the UAV 100, or even inside the UAV 100, during flight from a launch site to a target location 120. The target location 120 may be a point in space directly above a desired delivery location. Then, when the UAV 100 reaches the target location 120, the UAV's control system may operate the tether-deployment mechanism 104 such that the payload 108, secured by the payload-release device 106, is suspended by the tether 102 and lowered to the ground, as shown in FIG. 1B. In an example, a control system detects that the payload 108 has been lowered to a point where it is at or near the ground (e.g., at the delivery location). In response to detecting the payload 108 is at or near the ground, the control system may operate the payload-release device 106 to release the payload 108, and thereby detach the payload 108 from the tether 102. After releasing the payload 108, the control system can operate the tether-deployment mechanism 104 to retract the payload-release device 106 to the UAV 100, as shown in FIG. 1C. For example, the tether-deployment mechanism 104 may include a winch that reels the tether 102 on and off of a spool to lower and raise the payload-release device 106.

The control system may use various types of data, and various techniques, to determine when the payload 108 and/or payload-release device 106 have lowered to be at or near the ground. Further, the data that is used to determine when the payload 108 is at or near the ground may be provided by sensors on UAV 100, sensors on the tether 102, sensors on the payload-release device 106, and/or other data sources that provide data to the control system. The control system itself may be situated on the payload-release device 106 and/or on the UAV 100. For example, the payload-release device 106 may include logic module(s) implemented via hardware, software, and/or firmware that cause the payload-release device 106 to function as described herein, and the UAV 100 may include logic module(s) that communicate with the payload-release device 106 to cause the payload-release device 106 to perform functions described herein.

A. Tether

In practice, the tether 102 used to suspend the payload-release device 106 (and payload 108) from the UAV 100 may be formed from a variety of materials. The tether 102 may include, for example, high tensile-strength polymeric fibers, metallic and/or synthetic cables, and other materials that exhibit relatively high tensile-strength per unit weight. The tether 102 may also be selected, at least in part, to be a material that is suitable for interfacing with the tether-deployment mechanism 104. In some examples, the tether 102 may also be operable for transmitting information between the payload-release device 106 and the UAV 100. For instance, the tether 102 may include, or be coupled to, a data-transmission wire formed of a conductive material (e.g., for conveying data-encoded electrical signals) and/or a fiber optic line (e.g., for conveying data-encoded optical signals).

B. Tether-Deployment Mechanism

In an example the tether-deployment mechanism 104 may include or take the form of a winch that is configured to deploy the tether with a payload attached thereto (e.g., via the payload-release device 106). Such a winch may include a motor (e.g., a DC motor) that can be actively controlled by a servomechanism (also referred to as a "servo") and a microcontroller. The microcontroller may output a desired operating rate (e.g., a desired RPM) for the winch, which may correspond to the speed at which the payload 108 should be lowered towards the ground. The servo may then control the winch so that it operates at a desired rate. In addition, the winch can be used to retract the tether 102 and the payload-release device 106 attached thereto following delivery of the payload 108. Thus, the winch may function to reverse its direction of rotation to achieve refraction.

In some cases, the tether-deployment mechanism 104 may incorporate or be associated with an encoder that senses rotation of the spool letting out (or reeling in) the tether 102. Data from such an encoder can then be used by a control system of the UAV 100 to help in determining the distance between the payload 108 and the ground as the payload 108 is being lowered.

In addition, the tether-deployment mechanism 104 may vary the rate at which the payload 108 is lowered to the ground or the rate at which the payload-release device 106 is retracted back to the UAV 100. For example, a microcontroller may change the desired rate of lowering and/or retraction according to a variable rate profile and/or in response to other factors in order to change the rate at which the payload 108 descends towards the ground. To do so, the tether-deployment mechanism 104 may adjust the amount of braking or the amount of friction that is applied to the tether. For example, to vary the deployment rate, the tether-deployment mechanism 104 may include friction pads that can apply a variable amount of pressure to the tether. As another example, a line-deployment mechanism 104 can include a motorized braking system that varies the rate at which a spool unwinds the tether 102 during lowering, or reels in the tether 102 during retraction, by making adjustments to a motor speed (e.g., RPM) or gearing applied to the motor. Other examples are also possible.

In some examples, the tether-deployment mechanism 104 may be attached to the payload-release device 106, which is lowered with the payload 108, rather than being secured to a housing of the UAV 100. For example, a winch could be attached to the top of the payload-release device 106. In such an example, the winch may be operable to hold the payload-release device 106 (and the payload 108) at or near the bottom of the UAV 100 during flight to the delivery location. Then, upon arriving at the delivery location, the winch may function to lower the payload 108 by sliding along the tether 102 and/or using a brake to adjust the rate at which the tether 102 is released in accordance with a variable rate. Moreover, in an example that omits the payload-release device 106, such a top-mounted winch may be mounted directly to the payload 108.

C. Payload-Release Device

FIG. 1D is a simplified block diagram of the payload-release device 106. The payload-release device 106 may take different forms in different implementations. The device 106 can be connected to the UAV 100 by the tether 102, and the tether-deployment mechanism 104 on the UAV (e.g., a winch) can reel and unreel the tether 102 to raise and lower the device 106 during a delivery operation. The payload-release device 106 can be suspended from the UAV 100 using the tether 102 and can function to alternately secure the payload 108 (e.g., during descent from the UAV) and release the payload 108 (e.g., upon reaching the ground).

As shown in FIG. 1D, the payload-release device 106 may include various systems and components, although one or more systems and/or components may be omitted and/or modified in some examples. For example, the payload-release device 106 may include a processing system 120, a memory 122, a communication system 128, a power supply 132, a bystander communication module 136, UAV tracking features 140, position sensor(s) 150, a translational position system 160, and a payload release system 170, each of which may be mounted on or within a housing of the device 106 and communicatively coupled to one another. In some examples, the payload 108 and/or payload-release device 106 may be designed with features that help to prevent the payload 108 and/or the payload-release device 106 from getting stuck or caught during descent (e.g., to prevent getting caught and/or tangled in a tree or on a power line). For instance, the payload 108 and/or payload-release device 106 may take the form of or be housed in a teardrop-shaped housing, or another shape that can incorporates surfaces that move obstacles aside so as to allow the payload-release device 106 to be more easily moved up and down by the tether 102 without getting stuck.

i. Processing System

The processing system 120 may be configured to provide various functions described herein. The processing system 120 may include or take the form of program instructions stored in a non-transitory computer-readable medium (e.g., the memory 122) and may also include a variety of functional modules implemented by software, firmware, and/or hardware.

The processing system 120 may include one or more general purpose or special purposes microprocessors in communication with memory 122. Memory 122 may include a non-transitory computer-readable medium. In practice, the processing system 120 may cause the payload-release device 106 to perform certain functions by executing program instructions 124 stored in memory 122. For instance, upon execution of the program instructions 122, the processing system 120 may obtain sensor data from the position sensors 150, and generate command signals that cause an actuator 172 of the payload release system 170 to move so as to engage or disengage the payload 108 based on characteristics of the obtained sensor data. In some cases, the processing system 120 may additionally or alternatively include hardware-implemented and/or firmware-implemented logic modules. The memory 122 can also include data 126, which may be used to store information particular to the specific payload-release device 106. For instance, the data 126 may include information related to a model number and/or serial number of the device 106 and/or information related to calibration of the position sensors 150 (or other systems), or operation of other systems in the payload-release device 106 (e.g., communication protocols used by the communication system 128).

ii. Communication System

The communication system 128 can be used to send and receive data between the payload-release device 106 and the UAV 100. For example, the communication system 128 may be a wireless communication system that sends and receives data-encoded electromagnetic transmissions using an antenna to create a wireless data link 130 with the UAV 100.

The communication system 128 can function to send and receive information to and from the UAV 100. In some examples, the communication system 128 can include an antenna structure and can operate to exchange information with the UAV via a wireless communication link 130. The communication system 128 may additionally or alternatively send and receive information over a wireline link, such as a data transmission link incorporated with the tether 102. The communication system 128 may also include a modem for modulating and demodulating signals transmitted to and from the UAV 100. Among other features, the communication system 128 can allow for a control system associated with the UAV 100 to access information generated by sensors in the payload-release device 106 and vice versa. Additionally, the communication system 128 can allow for determinations related to operation of the payload-release device to be made by the processing system 120 in the payload-release device 106 and/or by a control system associated with the UAV 100 (e.g., a control system on the UAV 100 and/or a control system in communication with the UAV 100).

iii. Power Supply

The payload-release device 106 can include various systems and/or components that consume electrical power, such as the sensors 150, the communication system 128, the processing system 120, etc. The power supply 132 can provide power to such systems in the payload-release device 106. The power supply 132 may include a battery 134 and/or a capacitive device that can be charged with electrical energy, for example. The battery 134 may be charged through charging terminals 135 accessible from the exterior of the payload-release device 106. In some examples, the charging terminals 135 may include conductive pads that are arranged to electrically couple to corresponding terminals on the UAV 100 while the payload-release device 106 is secured to the UAV 100 (e.g., during flight mode operations of the UAV). For example, the charging terminals 135 may electrically couple to corresponding terminals on the UAV 100 when the payload-release device 106 is seated against the UAV 100. The battery 134 within the payload-release device 106 can then be recharged via the electrical connection.

Moreover, in some examples, such an electrical connection between the payload-release device 106 and the UAV 100 may be facilitated by the payload-release device 106 including an asymmetric surface that is received within a corresponding mating surface of the UAV 100 (e.g., a relief of the asymmetric surface). As the payload-release device 106 is being retracted toward the UAV 100, the asymmetric surface can interface with the mating surface to cause the payload-release assembly to rotate to a particular orientation at which the asymmetric surface is aligned with the mating surface. By ensuring the payload-release device 106 becomes seated against the UAV 100 in a repeatable orientation, the electrical contacts/terminals between the device 106 and the UAV 100 can be aligned for electrical connection. The asymmetric surface and/or mating surface may also include guide pins and corresponding receiving channels to facilitate self-alignment of the electrical contacts as the payload-release device 106 approaches the UAV 100. Additionally or alternatively, the electrical contacts/terminals may be arranged to be at least partially rotation insensitive. For example, a surface of the payload-release device 106 that is seated against the UAV 100 may be cylindrically symmetric (e.g., a conical surface) and be received into a corresponding mating surface on the UAV. The contacts/terminals may include cylindrically symmetric conductive rings at respective radii of the two cylindrically symmetric mating surfaces. As a result, the electrical contact between the respective terminals may be achieved regardless of the rotational orientation of the payload-release device 106. Other examples of self-aligned and/or rotation insensitive electrical and/or communication terminals between the payload-release device 106 and the UAV 100 are also possible.

In another example, the payload-release device 106 may be charged wirelessly. In particular, both the UAV 100 and the payload-release device 106 can include antennas for sending and harvesting energy, respectively. The UAV's power supply antenna may be situated along the exterior surface of the UAV or within the UAV, near the mating location where the payload-release device 106 is seated during flight mode. Similarly, the payload-release device 106 can have an energy-harvesting antenna situated near the surface of the payload-release device that is seated against the UAV 100 during flight mode. To charge the payload-release device, the power supply antenna can transmit energy at a particular power. The radiated energy induces voltage variations across the energy harvesting antenna in the payload-release device, and those voltage variations can be regulated and/or rectified by electronics therein to supply a charging current to the battery or other power supply module within the payload-release device. Among other benefits, a wireless charging connection may allow for relatively greater alignment tolerances between the payload-release device 106 and the mating surface of the UAV 100 that the payload-release device 106 is withdrawn to during flight mode. A wireless charging connection may also decrease the number of exposed electrical terminals required on the payload-release device, which may enhance durability and weather-resistance. Further, the power supply antenna and the energy-harvesting antenna may be configured to enhance the efficiency of power transfer from the power supply antenna and the energy-harvesting antenna, such as by an impedance matching technique, for example.

In some cases, the payload-release device 106 may additionally or alternatively be powered via electrical signals conveyed over the tether 102 (or another conductive linkage between the UAV 100 and the payload-release device 106).

iv. Bystander Communication System

The bystander communication system 136, which can be used to generate audible and/or visible cues for perception by people near a delivery location while the device 106 is raised and lowered. The various cues generated by the bystander communication module 136 are selected to facilitate safe, intuitive interactions between bystanders on the ground and a UAV delivery system.

The bystander communication system 136 can include one or more human interface modules configured to generate cues perceptible to people on the ground. For example, the bystander communication system 136 may include a light source and/or an audio source. The light source may include a lighting system that flashes or changes colors to indicate different states of the delivery system (e.g., one cue as the payload-release device 106 descends from the UAV 100, and a second cue as the payload-release device 106 is retracted back to the UAV 100). The light source may include one or more individual light emissive elements, such as light emissive diodes, and/or light transmissive elements, such as a liquid crystal device. For instance, the light source may include a display panel of emissive or transmissive elements on which scrolling text messages or pictures can be rendered. The audio source may include a loudspeaker that functions to output sound waves for perception by people on the ground. For instance, the loudspeaker may emit one audio cue during payload descent to provide a cue to bystanders and/or payload recipients that the payload is approaching the ground (e.g., a recording or synthesized voice saying "Please stand back as your package is being delivered" or another warning message), and another audio cue following payload delivery to provide a cue that the delivery is complete (e.g., a recording or synthesized voice saying "You can now collect your package" or another message).

In addition to interface and/or communication capabilities performed by the bystander communication system 136, the UAV delivery system may include back-end processes to facilitate communications with particular individuals who are payload recipients. For instance, the system may generate and send messages to payload recipients via various communication networks (e.g., cellular telecommunication networks, wide area networks, such as the Internet, etc.). In a particular example, a control system associated with the UAV delivery system may send a given intended payload recipient one or more communications via text messages, emails, etc., so as to inform the recipient of the progress of the delivery process. Such messages may include indications of: an estimated delivery time, an anticipated time until payload delivery, indications that the payload (or UAV bearing the payload) has departed for the delivery location, has reached a predetermined distance from the delivery location, has arrived at the delivery location, that the payload is descending toward the ground, and/or that delivery is now complete. In some cases, moreover, the system may allow for an intended recipient to send responsive communications to the UAV control system so as to effect a modification of one or more delivery parameters, including, without limitation, a delivery time, a delivery location, and/or other aspects of the delivery process. Additionally, the system may allow the intended recipient to accept, deny, and/or re-direct a given payload via communication with the control system. Other examples are also possible.

v. UAV Tracking Features

The payload-release device 106 can include features 140 that facilitate position tracking using the UAV 100. For example, the payload-release device 106 may include one or more reflector(s) 142 and/or emitter(s) 144 situated on the payload-release device 106 so as to direct light toward the UAV 100 while the payload-release device 106 is suspended from the UAV 100 via the tether 102. For instance, the reflectors(s) 142 may include an arrangement of reflective surfaces mounted on a top surface of a housing of the payload-release device 106. Similarly, the emitter(s) 144 may include one or more sources of radiation, such as light emissive diodes mounted to a top surface of the housing of the payload-release device 106. The reflective surfaces 142 and/or emitters 144 can then be detected using an imaging system on the UAV 100 that is arranged to capture a field of view including the payload-release device 106 while the payload-release device 106 is suspended from the UAV 100 via the tether 102. The imaging system on the UAV 100 can capture an image of the suspended payload-release device 106. The image can then be used to identify a current location of the payload-release device 106 with respect to the field of view of the imaging system. In particular, the captured image can be analyzed to identify a location in the image that corresponds to the arrangement of reflectors 142 and/or emitters 144. The identified location can then be mapped to a corresponding location of the suspended payload-release device 106.

For instance, the imaging system on the UAV 100 may include a camera situated on a gimbal mount so as to have a substantially fixed downward-facing perspective of the region below the UAV 100. During a delivery operation, such a camera can then be used to track the payload-release device 106 by identifying a region of a captured image that includes the reflector(s) 142 and/or emitter(s) 144. The identified region or image coordinate in the captured image can then be mapped to a location of the payload-release device 106 based on the current location and orientation of the UAV 100, the orientation of the imaging system with respect to the UAV 100, and the altitude difference between the UAV 100 and the payload-release device 106.

The reflectors 142 and/or emitters 144 may be configured to assist in identifying the reflectors 142 and/or emitters 144 and in distinguishing them from background light sources. In some examples, the reflectors 142 and/or emitters 144 may be arranged in a pattern in which one or more of the reflectors 142 and/or emitters 144 are physically separated from one another. In some examples, the reflectors 142 and/or emitters 144 may reflect/emit light with different colors. In some examples, the reflectors 142 and/or emitters 144 may emit light at a particular wavelength and the imaging system may filter incoming light for that wavelength. For example, the emitter 144 may be an infrared LED or the reflector 142 may be configured to preferentially reflect infrared light (e.g., from infrared radiation emitted by the UAV 100). Other examples are also possible in which the reflectors 142 and/or emitters 144 are arranged so as to provide a pattern of light that can be identified from image data captured by an imaging system on the UAV 100.

In examples in which the tracking features 140 include two or more reflectors 142 and/or light sources 144, the relative orientation of the features 140 can be used to determine an orientation of the payload-release device 106 (e.g., a degree of rotation about an axis defined by the tether 102). For example, if the payload-release device 106 includes two LEDs, one on each side, and the two emit light in different colors (or are otherwise distinguishable via modulation, intensity, etc.), the location of the two emitters with respect to one another can be used to determine a degree of rotation of the payload-release device 106 about the tether 102.

Furthermore, the observed separation between multiple emitters 144 (and/or reflectors 142) can be used to estimate the altitude distance between the imaging system on the UAV 100 and the payload-release device. That is, for a given perspective ratio of the imaging system, emitters separated by a fixed amount appear closer together, as measured in image coordinates (e.g., pixels), when the emitters are distant from the imaging system, than when the emitters are closer to the imaging system. The system may therefore use separations measured in image coordinates to estimate a distance to the payload-release device 106, and thus an altitude of the payload-release device 106. Similarly, if the tracking system is informed of the altitude of the payload-release device 106 from another source (e.g., an altimeter on the payload-release device 106), the imaging system may tune a pattern recognition routine and/or identification routine to scale a pattern of emitters being searched for within obtained image data.

In some examples, the upward-facing emitter 144 may emit light in a narrow wavelength range (e.g., a light emissive diode that emits at a narrow band of frequencies) and the imaging system on the UAV 100 may include a corresponding narrow band filter that passes the emitted light. The filter on the imaging system can thus preferentially select the light from the emitter 144 while decreasing interference from other light. The payload-release device 106 can thereby be identified within an image captured by the imaging system more readily than otherwise possible. In order to determine a position of the payload-release device 106 from the image data, an image coordinate at which the tracking features 140 are identified is mapped to a physical location based on a geometric relationship between the orientation of the imaging system field of view and the altitudes of the UAV 100 and the payload-release device 106. In some examples, the imaging system may be mounted on a stabilizing mount, such as a three-dimensional gimbal mount, so as to substantially fix an orientation of the imaging system with respect to the orientation of the UAV 100 and/or the ground. As such, a given image coordinate of a captured image obtained using the stabilized imaging system can be mapped to a line in the field of view of the imaging system that extends between the imaging system and the ground. Combining the direction information with information regarding the current altitude of the payload-release device 106 can then allow for determining the three-dimensional location of the payload-release device.

Moreover, because the imaging system is situated on the UAV 100, at a perspective so as to look down on the payload-release device 106 as it is suspended from the UAV 100 via the tether 102, the location information derived via the image tracking system may be useful in identifying the location of the payload-release device in a surface transverse to the direction of the tether 102. To the extent that the imaging system is arranged with a perspective that is close to a connection point between the tether 102 and the UAV 100 (e.g., near the tether-deployment mechanism 104), image coordinates of the imaging system can be mapped to locations of the payload-release device 106 on surfaces defined by fixed lengths of the tether 102. That is, for a given length of deployed tether, the payload-release device 106 can be constrained to move along a surface on which each point is the same distance from the tether attachment point on the UAV 100, and that distance is defined by the length of deployed tether. The different locations along that surface can each be mapped to a particular image coordinate in the field of view of the imaging system. Thus, the three-dimensional location of the payload-release device 106 with respect to the UAV 100 can be determined based on the length of deployed tether (or another indicator of the altitude of the payload-release device) and image coordinates at which the tracking features 140 are observed via the imaging system on the UAV 100. The accuracy of the determined location is then a function of the imaging resolution and the resolution of the altitude indicator.

vi. Position Sensors

The sensor(s) 150 can include one or more systems that generate data indicative of the altitude, position, and/or status of the payload-release device 106 and/or the payload 108. The sensor(s) 150 may include inertial motion sensor (IMU) 152 (e.g., accelerometers and/or gyroscopes) that function to generate data indicative of rotational and/or translational motion of the payload-release device 106. The sensor(s) 150 may additionally or alternatively include an altitude sensor 154, such as a barometric altimeter that functions to measure the local atmospheric pressure, which can be used to estimate the current altitude of the payload-release device 106. The sensor(s) 150 may additionally or alternatively include an active ranging system 156 such as a laser ranging system or radio ranging system that estimates the distance to the ground based on time of flight of reflected radiation transmitted by the payload-release device 106 and reflected from the ground. Similarly, such active ranging systems may function to estimate the distance to the UAV 100 from which the payload-release device 106 is suspended.

The sensor(s) 150 may additionally or alternatively include imaging system(s) that function to capture image data or video from a camera mounted on the payload-release device 106. The imaging system(s) may include, for example a pair of cameras that can be used to estimate the distance to the ground stereoscopically, for instance, by focusing the two spatially separated cameras on a common ground feature and determining distance based on the angle between the cameras. Other sensors may include proximity sensors and/or encoders that function to provide an indication of whether the payload 108 is secured to the payload-release device 106. The sensor(s) 150 can function to generate sensor data indicative of the various parameters they are configured to measure, and the sensor data can then be provided to the UAV 100 (via the communication system 128) and/or to the processing system 120 on the UAV 100.

Moreover, in some examples, sensor data related to the position of the payload-release device 106 may be generated by, or in cooperation with, components on the UAV 100. For example, a position tracking system may include an upward-facing light source and/or reflector mounted on the payload-release device 106 (e.g., the tracking features 140), and a downward-facing imaging system mounted on the UAV 100. The imaging system can track the position of the suspended payload-release assembly 106 by tracking the location of the upward-facing light source and/or reflector in the field of view of the imaging system. The UAV 100 may also include other sensors that generate data related to the position of the payload-release device, such as an encoder that indicates a length the tether 102 deployed from the tether-deployment mechanism 104, and thus an altitude of the payload-release device, a line tension sensor that indicates a degree of tension on the tether 102 and thus whether the payload-release device 106 is resting on the ground, a thrust sensor that indicates an amount of thrust provided by the UAV's propulsion system and thus whether the payload-release device 106 is resting on the ground, and/or other sensors.

For example, the length of the tether 102 that has been let out by the tether-deployment mechanism 104 may be used to determine the distance between the payload 108 and the ground (i.e., the altitude of the payload 108). More specifically, given the height of the payload 108, the height of the payload-release device 106, the length of the tether 102, and the altitude difference between the top of the tether 102 and the point where altitude is measured by the UAV 100, the UAV 100 may determine the distance between the bottom of the payload 108 and the ground. Thus, the distance between the payload 108 and the ground can be updated as the line 102 is deployed, which may be indicated by readings from an encoder associated with the tether-deployment mechanism 104.

Data from the sensors 150 can then be used to estimate the altitude and/or position of the payload-release device 106 as it is lowered to the ground. For example, the accelerometer data and/or altimeter data can be used to determine how far the payload-release device 106 (and the payload 108) has been lowered using the tether 102, and thus how much distance remains to the ground. In addition, data from the accelerometer 152 may be used to detect a collision with the ground by the payload-release device 106 and/or the payload 108. Such a collision event may be indicated by the accelerometer data as an abrupt deceleration event with a characteristic signature, for example. In some examples, impact with the ground may be indicated by acceleration (as indicated by data from an accelerometer mounted in the payload-release device 106) with a magnitude that exceeds a threshold. Information from such sensors can then be communicated to the UAV 100 using the communication system 128. Moreover, the determination that the device 106 is at or near the ground may be based on one or more factors, including sensor data from position sensors on the device 106 (e.g., accelerometer and/or altimeter data), sensor data from sensors on the UAV 100 (e.g., encoder, image data, and/or tether tension data), and/or a communication from a remote control system (e.g., a remote operator may observe a video feed or other indicia and alert the UAV 100 when the device 106 is at or near the ground).

vii. Translational Positioning System

The payload-release device 106 can include a translational positioning system 160. The translational positioning system 160 can include thrusters 162 and/or air foils 164 that can be used to apply force on the payload-release device 106 while the payload-release device 106 is suspended from the UAV 100 via the tether 102. The translational positioning system 160 uses one or more components to interact with the surrounding air to generate force on the payload-release device 106 and may be alternately referred to herein as an air propulsion system. The thruster 162 and/or air foil 164 can apply force on the payload-release device 106 in a direction that is at least partially transverse to the direction of the tether 102 as the payload-release device 106 is suspended from the UAV 100 via the tether 102. For instance, the thruster 162 can include a turbine, fan, or other rotating blade mounted to the housing of the payload-release device 106. The thruster 162 may also be situated within a shroud to both direct airflow and to protect the blade and other objects from interfering with moving parts of the thruster 162 (e.g., rotating blades). The airfoil 164 may include a wing or sail of rigid or flexible material that is mounted to the housing of the payload-release device 106 so as to apply force on the payload-release device 106 via interaction with air surrounding the payload-release device 106.

For example, a pair of thrusters may be oriented to generate thrust transverse to one another and transverse to the tether 102. Operating the thrusters 162 in respective directions can therefore cause the payload-release device 106 to move in a desired direction transverse to the direction of the tether 102. Moreover, the payload-release device 106 can be moved along the direction of the tether 102 by reeling the tether 102 in and out (e.g., via the tether-deployment mechanism 104). Thus, the payload-release device 106 can be moved along a desired three-dimensional path by manipulating both the tether-deployment mechanism 104 and the translational positioning system 160.

In practice, the translational positioning system 160 may be used to adjust the location of the payload-release device 106 as it descends via the tether 102 according to position feedback information from the imaging system used to track the tracking features 140, from the position sensors 150, and/or from other sources. For example, the translational positioning system 160 may be used to cause the payload-release device 106 to descend along a particular path of descent associated with an intended delivery location. The path of descent may be, for example, a predicted path along which the payload-release device 106 will travel to the intended delivery location. The path of descent may be, for example, a straight line normal to the ground (e.g., in conditions with no wind or other atmospheric disturbances that apply force to the payload-release device other than gravity). The path of descent may also be, for example, a path that account for wind applying force on the suspended payload-release device 106 in a direction at least partially transverse to the direction of the tether 102. A control system (e.g., on the UAV 100) can be used to monitor the positioning information to detect a deviation from the predetermined path of descent. The control system can then cause the translational positioning system 160 to direct the descending payload-release device 106 toward the predetermined path of descent. Additionally or alternatively, the control system may adjust a position of the hovering UAV 100 to at least partially compensate for a detected deviation from the predetermined path of descent.

viii. Payload Release System

The payload-release device 106 can also include a payload-release system 170, which can include one or more electromechanical components that can be manipulated to alternately secure the payload 108 or release the payload 108. The payload-release system 170 can include one or more actuator(s) 172 (e.g., a solenoid, motor, hydraulic component, etc.), grippers 176 (e.g., clamps, opposable arms, etc.), retaining rods or hooks 174, or other components. The actuator 172 may be mechanically linked to the retaining rod 174 and/or gripping surface 176 to facilitate moving the rod 174 and/or gripper 176 between different positions in response to electronically generated signals (e.g., from the processing system 120). For example, in one position, component(s) of the payload release system 170 can couple the payload-release device 106 to the payload 108, and in another position, component(s) of the payload release system 170 can release the payload 108 from the payload-release device 106.

The payload-release system 170 may secure the payload 108 to the payload-release device 106 in different ways. In some examples, grippers, fasteners, or other engaging surfaces function to secure the payload 108 (e.g., by applying pressure to the payload 108 or by engaging corresponding surfaces of the payload 108). In some cases, the payload 108 may include one or more apertures or other standardized interfacing features configured to interface with the payload-release device 106. Thus, the payload-release device 106 may include prongs or the like that interface with the payload 108 by passing through the payload's apertures (or otherwise engaging standardized features). The payload-release device 106 can also release the payload 108 by disengaging the grippers or engaging surfaces, or by detaching from the payload's standardized features.

In some cases, the retaining rod 174 may include a hook that is rotated between different positions via the actuator 172. In one position, the rod 174 can engage an aperture of a payload mount attachment while the mount attachment is inserted within a channel formed in a housing of the payload-release device 106. The mount attachment may be a substrate or other structure that extends from a top surface of the payload 108 and has an aperture formed therein for receiving the rod 174. While the lowering the payload 108 from the UAV 100, the mount attachment can be inserted into the channel and the rod 174 can cross through the aperture (e.g., by crossing through the channel) so as to engage the payload 108. The rod 174 can then be withdrawn from the channel to release the payload 108 from the payload-release device 106 once the payload 108 is on the ground.

Additionally or alternatively, the payload-release device 106 may include opposable arms. The opposable arms can be used to grip the payload 108 while lowering the payload 108 from the UAV 100, and then can be separated to release the payload 108 once the payload 108 is on the ground. Additionally or alternatively, the payload-release device 106 may also take the form of a container, bucket, cage, or other enclosure with a bottom (or other enclosing surface) that can be opened and/or removed. While the payload 108 is lowered from the UAV 100, the payload 108 can be secured within the enclosure, and then the bottom of the enclosure can be opened once payload 108 is on the ground. Additionally or alternatively, the payload-release device 106 may include one or more magnetic features, which may or may not be activated/deactivated in response to an input, such as permanent magnets, paramagnetic materials, electromagnets, etc. In such an example, the payload 108 may also include magnetic features, which may or may not be activated/deactivated in response to an input, and the payload 108 can be secured to the payload-release device 106 via magnetic attractive forces between such magnetic features and then the payload 108 can be released by deactivating at least one of the magnetic features or by overcoming the attractive force. Additionally or alternatively, the payload-release device 106 may include an engaging rod or hook that engages a corresponding depression or aperture in the payload 108. For example, the payload 108 may be formed to include one or more loops along its top or side surfaces. To secure the payload, the rod(s) or hook(s) of the payload-release device 106 can be maneuvered to engage such loops. Similarly, the payload can be released by manipulating the rod(s) or hook(s) to disengage the loops. In some examples, the rod, hook, or other payload-engaging mechanism may be implemented as: a coupling link with a portion that opens and closes, similar to a carabiner; a hook mounted below the payload-release device 106 (i.e., not mounted to pass within a channel); and/or a closed loop that engages a hook on the payload 108 and then translates and/or rotates to disengage from the hook during payload release. The payload-release device 106 may additionally or alternatively include other examples of devices, mechanisms, features, and systems may also be used to alternately engage a payload via a mechanical connection and, in response to determining it is time to release the payload, release the payload via manipulation of one or more components on the payload-release device 106 and/or payload 108.

Various other types of payload-release systems are also possible. The form of a payload-release device for a particular implementation may depend on, for example, the types of payloads to be delivered and the environmental conditions in which delivery will be made. For example, the payload-release device 106 may be positioned on the tether 102 or at the top of the tether 102, and may be operable to cut the tether or release the tether from the UAV 100 when the payload 108 is at or near the ground.

D. Control System

The UAV 100 may include or be associated with a control system configured to provide various functions described herein. The control system may include or take the form of program instructions stored in a non-transitory computer-readable medium and may also include a variety of functional modules implemented by software, firmware, and/or hardware. In some examples, the control systems described herein may include components located in the payload-release device 106, in the UAV 100, and/or at a remote location and in communication with the UAV 100. However, the various components are configured to communicate information amongst one another to coordinate functioning of the UAV 100 and the payload-release device 106 such that determinations can be made and/or actions can be performed by one component on the basis of information obtained via other components communicatively linked to that component.

The control system may be configured to autonomously navigate the UAV 100 toward a specified destination. For example, the control system may determine a set of flight-command instructions that cause propulsion systems of the UAV 100 to operate such that the UAV flies through a set of waypoints that define a route to the specified destination. Among other factors, the control system may plan routes based on information from other aerial vehicles (or control systems therefore) and/or based on pre-determined guidance, regulations, and/or other constraints regarding allowable routes, altitudes and speeds in particular regions, etc. The control system may also be configured to operate the payload delivery system 110 to controllably lower the payload 108 to the ground, release the payload 108, and then retract the payload-release device 106 back to the UAV 100. Thus, the control system can function to regulate the operation of a variety of actuators, servo controls, and other electromechanical devices that are involved in the operation of the payload delivery system 110.

The control system of UAV 100 may also control the payload-release device 106 to release the payload 108 at or near the ground. For example, the control system may trigger the payload-release device 106 to release the payload 108 (e.g., by actuating the payload release system 170) after a certain length of the tether 102 has been let out by the tether-deployment mechanism 104, such that it is expected that the payload 108 is on the ground, or near enough to the ground that it can safely drop to the ground. The control system may also receive sensor data from an accelerometer on the payload-release device 106, and determine that the payload 108 is on the ground when the accelerometer data indicates that the payload 108 had an impact with the ground followed by remaining at rest. Other examples are also possible in which the control system can function to determine that the payload 108 is at or near the ground and then responsively cause the payload-release device 106 to release the payload 108.

In some cases, the control system can operate the payload delivery system 110 such that the rate of descent of the payload 108 is altitude dependent. For example, the control system can initially allow the payload 108 to descend at a maximum rate of descent. The control system can monitor information from sensors indicating the descending altitude of the payload 108, and upon detecting that the payload 108 is within a particular distance of the ground, the control system can cause the tether-deployment mechanism 104 to begin slowing the descent of the payload 108. The control system may cause the rate of descent to slow to a predetermined safe speed by the time the payload 108 is near enough to the ground that it could interfere with (or be grabbed by) objects or people on the ground. Similarly, the control system may also cause the payload-release device 106 to ascend back to the UAV 100 in an altitude-dependent manner after releasing the payload 108.

E. Example Payloads

The payload 108 may be a standardized container or parcel that includes one or more features configured to interface with the payload-release device 106. For instance, the payload 108 may include one or more loops, indentations, tabs, anchor points, or other structural features arranged to be engaged by corresponding components of the payload-release device 106 (e.g., the payload release system 170). In some cases, the standardized features of the payload 108 may be integrated in a packaging module (e.g., a reusable or disposable container), and the packaging module may house (or be fastened to) one or more items that are being delivered using the UAV 100. Such items may include food, medical equipment or supplies, retail goods, relief items, or any other items that may be delivered by a delivery service. In some cases, the delivered items may be supplied to stranded or isolated people in an emergency or rescue scenario. In some cases, the payload 108 may also include an identifying element to facilitate recognition and/or differentiation, of the payload 108 from other payloads when being sorted and handled. The identifying element may include an RFID tag or an optically scanned linear or two-dimensional barcode. The identifying element can then be associated with information regarding the particular payload in a database that can be accessed by various systems used in handling/sorting payloads, and in loading the UAV 100. For example, such a database may associate the identifying element with contents of the payload, delivery destination, and/or other information pertaining to the particular payload and its delivery. Systems interfacing with a given payload can then scan its identifying element and retrieve the information from the database that relates to the given payload.

In some examples, the payload 108 may take the form of a container that includes medical-support devices and/or other items intended to help in a medical situation. In other examples, the payload 108 may itself be a medical-support device (e.g., a defibrillator) or another type of medical support item, such as a pharmaceutical medicine. Generally, the payload 108 may include any type of item to be delivered, including non-medical items such as goods ordered from a non-medical delivery service or items shipped through a shipping service.

F. Emergency-Release System

In yet a further aspect, a UAV 100 may include an emergency-release system (not shown in the Figures), which is configured to cut or release the tether 102 from the UAV 100. In particular, the UAV 100 may be configured to detect certain emergency situations, such as the tether 102, payload-release device 106, and/or payload 108 becoming stuck (e.g., in a tree or other obstacle), and to automatically cut the tether 102 when such an emergency situation is detected. The emergency situation may also involve the tether 102 and/or payload-release device 106 being grabbed by an individual on the ground. By cutting the tether 102 in such emergency situations, the UAV 100 can prevent damage to or from the UAV 100, such as may occur in a scenario where the UAV 100 is pulled to the ground by an entangled tether 102.

Various types of emergency-release mechanisms are possible. The emergency-release mechanisms may be configured to cut the tether 102 or otherwise release the tether 102 from the UAV 100. In one example, the emergency-release mechanism may include a blade mounted on a cartridge that can be propelled through a firing cylinder by igniting a chemical explosive or propellant. The firing cylinder can be mounted on the UAV 100 near the tether-retraction mechanism 104 such that, when fired, the motion of the cartridge causes the blade to sever the tether 102 and thereby disconnects the unreeled tether 102 (and payload-release device 106) from the UAV 100.

Further, various types of data may be analyzed to determine if and when an emergency-release mechanism should be used to release the tether 102. The control system can function to determine that such an emergency situation has occurred based on data from sensors on the UAV 100 and/or the payload-release device 106. Indications of the emergency situation may be provided by the position sensors 150 in the payload-release device 106 and/or from sensors generating data indicative of a condition of the tether 102 (e.g., a line tension sensor). Further, the UAV's control system could analyze image data from a camera, data from a line-tension sensor, data from sensors monitoring thrust exerted by the UAV's propulsion systems, and/or other types of data to determine that the payload 108 and/or payload-release device 106 is stuck, has been interfered with, or that deployment of the payload 108 has otherwise failed. Upon determining that an emergency situation has occurred, the control system can responsively use the emergency-release mechanism to release the payload 108 and/or the payload-release device 106 (e.g., by severing the tether 102). In some cases, the control system may receive an indication of the emergency situation from a remote terminal where a supervisory control operator is monitoring sensor data and has determined that the tether 102 should be cut (e.g., based on analyzing a video feed from imaging system(s) associated with the UAV 100).

G. Other Aspects

In some examples, the UAV 100 may include features that can hold the payload 108 in place and/or stabilize the payload during flight. Such features may be mechanically adjustable such that the tether-deployment mechanism 104 can lower the payload 108 upon arriving at the delivery location. For instance, in the configuration shown in FIG. 1A, UAV 100 includes moveable retaining brackets 114. The brackets 114 may interface with the payload 108 and/or device 106 to hold the payload 108 in place during flight, as shown in FIG. 1A. And when UAV 100 reaches the delivery location, the brackets 114 may be moved away from payload 108, so that the payload 108 can be lowered without interference from the brackets 114. Note that other types of mechanisms may also be used to hold the payload 108 in place and/or to stabilize the payload 108 during flight. Moreover, the payload 108 may be held in place during flight by the device 106, without use of any additional features.

Further, in some implementations, the payload delivery system 110 may omit the payload-release device 106. For example, the payload itself may incorporate a rolling mechanism that traverses the tether 102 and simply rolls off the end of the tether 102 upon reaching the end, thereby releasing the payload 108 from the UAV 100.

In some examples, a UAV 100 may additionally or alternatively be configured to pick up items from the ground using the payload delivery system 110 shown in FIGS. 1A-1D, or a different type of system.

III. Example Payload-Release Device

Figure 2A:
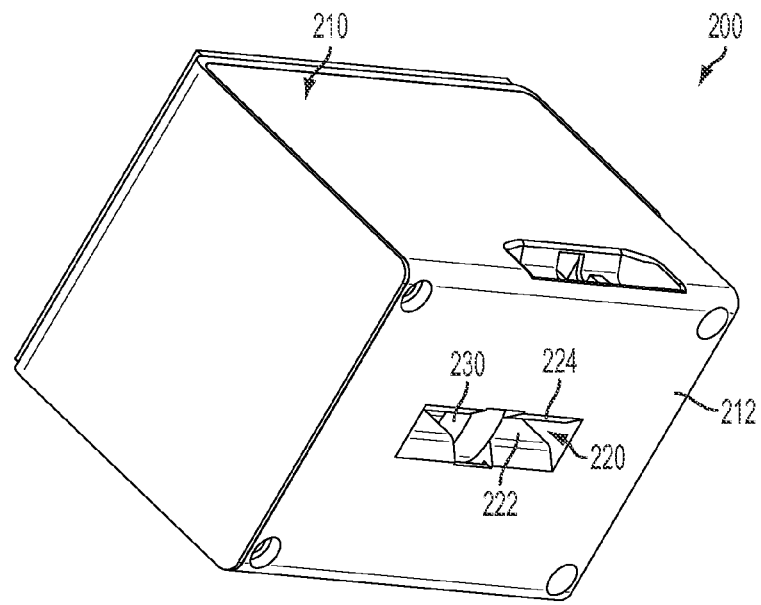
FIG. 2A is an aspect view of an example payload-release device.

FIG. 2A is an aspect view of an example payload-release device 200. The payload-release device 200 may include some or all of the functionality of the payload-release device 106 described in connection with FIGS. 1A-1D. The payload-release device 200 includes a housing 210, which may take a variety of forms. In some examples, the housing 210 may be an enclosure formed of a rigid material such as metal and/or plastic. The housing 210 may have surfaces designed to help prevent the device from becoming stuck or entangled while being lowered or raised by the tether. For example, the housing 210 may have a generally cubic or cuboid shape with rounded or partially rounded corners and/or edges between sidewalls. Many other shapes are possible.

The housing 210 can include a bottom surface 212 that includes a channel 220. The bottom surface 212 may be a surface configured to be faced against a payload while the payload-release device 200 is secured to the payload. Thus, the bottom surface 212 may be generally flat (i.e., planar) or may be another surface that is configured to mate against a surface of a payload. The channel 220 may be integrally formed in the bottom surface 212, or may be a cutout region of the bottom surface 212. The channel 220 includes sidewalls 222, 224, which have a separation that defines a width of the channel 220. The sidewalls 222, 224 may be approximately transverse to the bottom surface 212 and the sidewalls 222, 224 may optionally be connected to one another by respective end walls that define a length of the channel 220 transverse to its width. The sidewalls 222, 224 may also have a non-constant separation distance throughout the depth of the channel 220. For example, near the bottom surface 212, the sidewalls 222, 224 may be separated by a greater distance than further within the channel 220. Moreover, the sidewalls 222, 224 may be angled so as to become gradually closer to one another, at greater depths within the channel 220. As such, a payload mount attachment inserted into the channel 220 (e.g., the attachment 240 in FIG. 2B) can be at least partially aligned and/or guided into the channel by the sidewalls 222, 224.

A retaining hook 230 is shown in an engaged position in FIG. 2A. The retaining hook 230 crosses the channel 220. The retaining hook 230 can pass through respective entry locations in the sidewalls 222, 224 to cross the width of the channel 220. As described below, while in the engaged position, a payload mount attachment inserted into the channel 220 can be secured by the retaining hook 230. The retaining hook 230 can also be withdrawn from the channel 220, which allows a payload mount attachment to exit the channel 220 without interference. Thus, the retaining hook 230 can be positioned to alternately: (i) engage a payload mount attachment inserted in the channel 220 and thereby secure the payload to the payload-release device 200, and (ii) release a payload mount attachment from the channel 220 and thereby release the payload from the payload-release device 200.

Figure 2B:
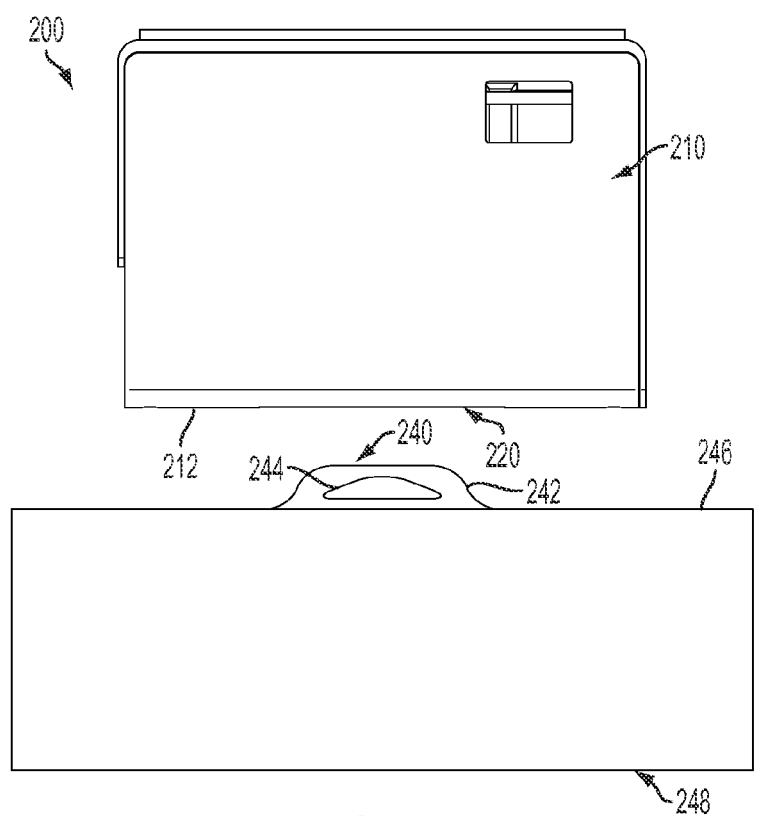
FIGS. 2B and 2C are side views of the example payload-release device aligned to engage a payload, and secured to the payload, according to example embodiments.
Figure 2C:
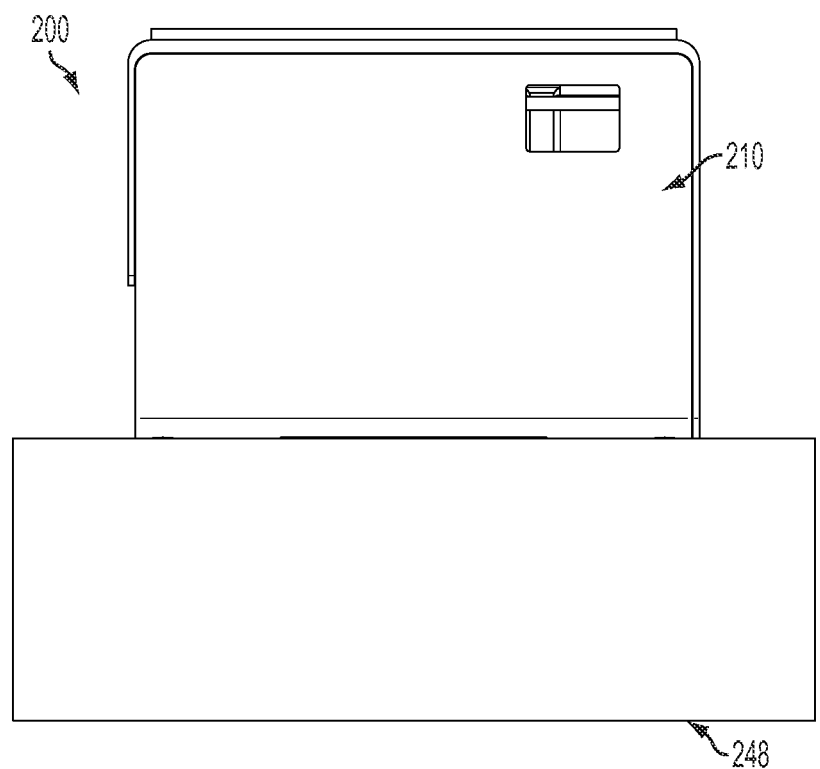

FIG. 2B is a side view of the example payload-release device 200 aligned to engage a payload 248. FIG. 2C is a side view of the example payload-release device 200 secured to the payload 248. The payload 248 includes a top surface 246. The top surface 246 of the payload 248 may be a generally flat surface, or another surface that is configured to interface with the bottom surface 212 of the payload-release device housing 210. A payload mount attachment 240 is situated on the top surface 246. The payload mount attachment 240 is configured to be received within the channel 220 and be engaged by the retaining hook 230. The payload mount attachment 240 can include a structure 242 that extends approximately transverse to the top surface 246. An aperture 244 in the structure 242 can then receive the retaining hook 230 while the structure 242 is inserted into the channel 220, which is shown in FIG. 2C. In particular, the retaining hook 230 can make contact with a rim of the aperture 244, which contact can mechanically couple the payload-release device 200 to the payload mount attachment 240 (and thus the payload 248). The structure 242 may be, for example a substrate such as a polymeric and/or fiber-based substrate. In some instances, the structure 242 may be a cardboard structure that extends from a cardboard packaging enclosure for the payload 248.

Figure 2D:
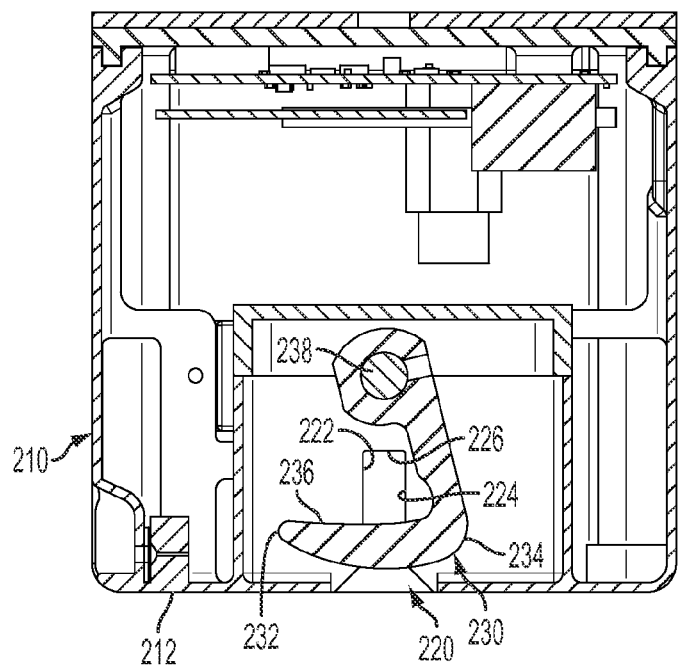
FIGS. 2D and 2E are side cross-sectional views of the payload-release device retaining hook in an engaged position and in a disengaged position, according to example embodiments.
Figure 2E:
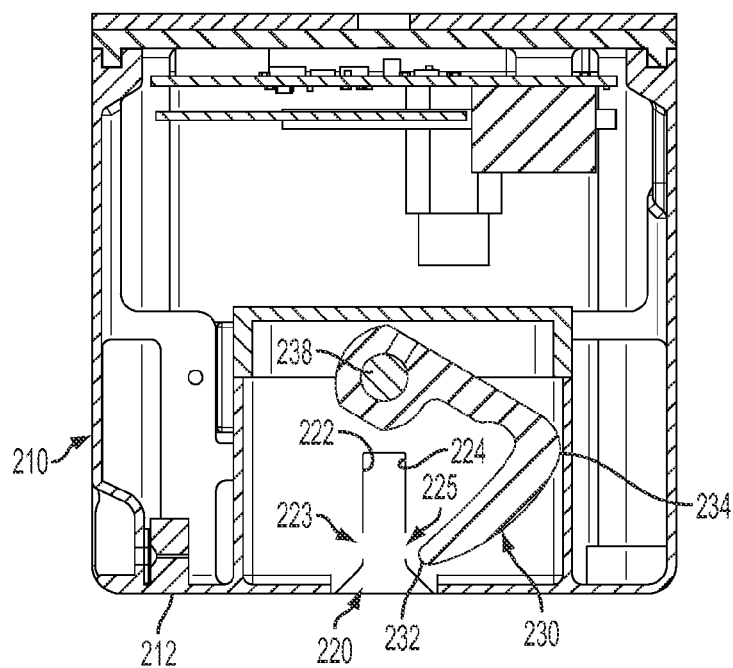

FIGS. 2D and 2E are side cross-sectional views of the payload-release device 200 retaining hook 230 in an engaged position and in a disengaged position. The depth of the channel 220 extends to an end wall 226, which can connect the sidewalls 222, 224. The retaining hook 230 can include an engagement surface 236 that extends between an elbow 234 and an end 232. The retaining hook 230 can enter the channel through entry locations 223, 225, which can be formed in the sidewalls 222, 224 to allow insertion of the retaining hook 230 into the channel 220. The entry locations 223, 225 can also be seen in FIG. 2A. In the engaged position, which is shown in FIG. 2D, the engagement surface 236 of the retaining hook 230 crosses between the two sidewalls 222, 224 of the channel 220. As a result, if a structure is inserted into the channel 220, the structure is enclosed by the engagement surface 236, the end wall 226, and the sidewalls 222, 224. In the disengaged position, which is shown in FIG. 2E, the retaining hook 230 is withdrawn from the channel 220 entirely. In particular, the engagement surface 236 does not cross the sidewalls 222, 224, and as a result a structure inserted in the channel 220 is not prevented from exiting the channel 220. While the disengaged position shown in FIG. 2D illustrates the retaining hook 230 entirely withdrawn from the channel 220 (i.e., the end 232 is outside the entry location 225), some examples may involve a portion of the retaining hook 230 situated within the channel 230 during disengagement (e.g., the end 232 passing through the entry location 225, but not entry location 223).

The retaining hook 230 is mounted within the housing 210 on an axle 238 so as to rotate about an axis defined by the axle 238. The axle can be oriented transverse to the width of the channel 220 such that rotating the retaining hook 230 causes the engagement surface 236 to move into and out of the channel 220. The axle 238 can be positioned within the housing 210 at a depth greater than the depth of the channel 220, and approximately centered with respect to planes defined by the two sidewalls 222, 224. Other configurations are possible. For instance, the axle may be located at a different location and/or orientation within the housing 210, and the retaining hook may take a different form so as to effect insertion and withdrawal of the retaining hook 230 in response to rotary actuation of the retaining hook with respect to the axle. Moreover, the retaining hook 230 may be implemented by a rod (or another structure) that is actuated by a linear actuator, rotary actuator, stepper motor, hydraulic system, etc. so as to alternately insert and withdraw the rod to and from the channel.

The retaining hook 230 and/or the payload mount attachment 240 can be formed of a rigid or semi-rigid material such as metal, plastic, composite, and/or paper-based substrates. The retaining hook 230 can be designed to have sufficient tensile strength to secure the payload 248 via the payload mount attachment 240 while the payload undergoes accelerations expected during a delivery and/or flight operations, for example.

Figure 2F:
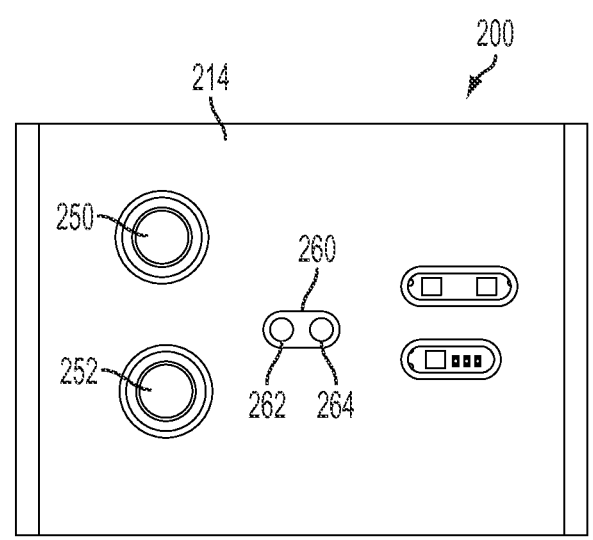
FIG. 2F is a top view of the example payload-release device, according to an example embodiment.

FIG. 2F is a top view of the example payload-release device 200. The top surface 214 of the housing can include a tether anchor 260. The tether anchor 260 can be an attachment point for coupling a tether to the payload-release device 200. The tether anchor 260 may include, for example, a pair of apertures 262, 264 and the tether can be coupled thereto by inserting the tether into one of the apertures 262, 264 and bringing it out of the other. Once threaded through the tether anchor 260, the tether may be coupled to itself using a clamp, knot, of another technique. The tether anchor 260 may be reinforced by an internal and/or external structure of the housing 210 in some examples to allow the tether anchor 260 to transmit forces from the tether exerted on the payload-release device and/or payload. Moreover, in some cases payload-release devices may include alternate tether anchor implementations and/or alternative physical features configured to couple the housing to a tether that is suspended from a UAV. For instance, some examples may include a tether anchor configured as a hook that receives a loop in a tether suspended from a UAV, one or more clamps that squeeze a suspended tether, a winch device that can be used to wind/unwind a portion of a suspended tether coiled around an axle of the winch device. Many other examples of tether anchors are also possible.

The top surface 214 can also include a first light emitting diode (LED) 250 and a second LED 252. The LEDs 250, 252 can be used to track the position of the payload-release device 200 while it is suspended from the UAV, for example using an imaging system on the UAV. In some cases, the LEDs 250, 252 can emit light in different colors (e.g., one red, one green) to facilitate distinguishing the pair of LEDs 250, 252 from background light sources. In some cases, the LEDs 252, 254 may be distinguishable from one another by one or more other factors, such as intensity, modulation pattern, etc. The LEDs 252, 254 may also be arranged on the top surface 214 in a manner that is rotation-variant (e.g., in a rotation-variant pattern). As a result, the positions of the two LEDs 252, 254, as observed via an imaging system on a hovering UAV, can be used to determine an orientation of the payload-release device 200.

IV. Example Operations

Figure 3A:
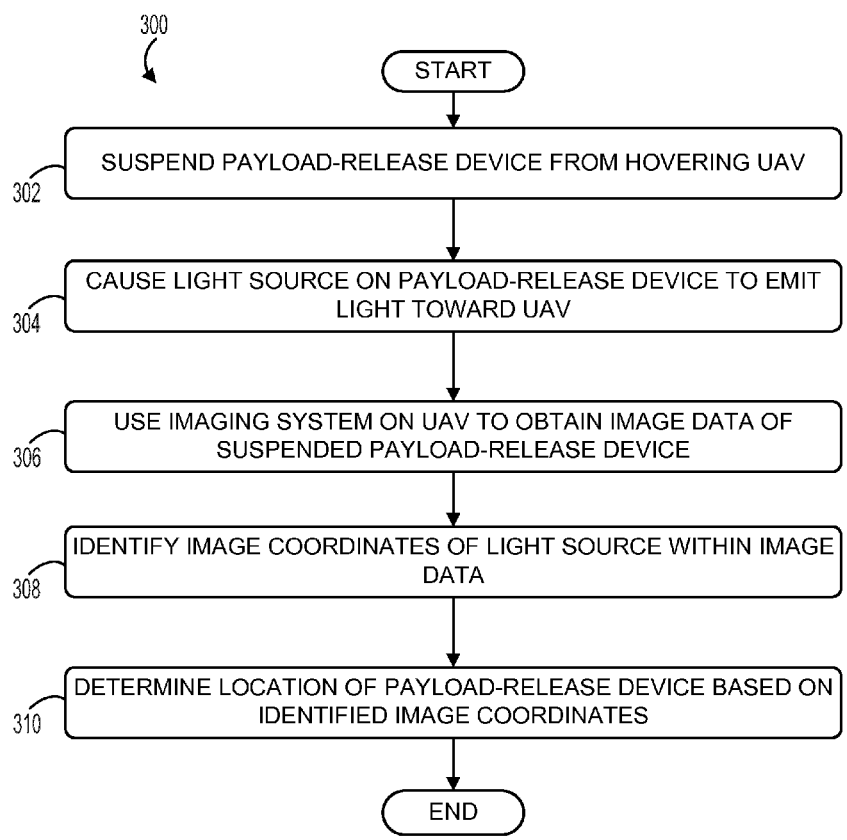
FIGS. 3A and 3B are flowcharts of example processes that can be performed by a payload delivery system during a delivery operation, according to example embodiments.
Figure 3B:
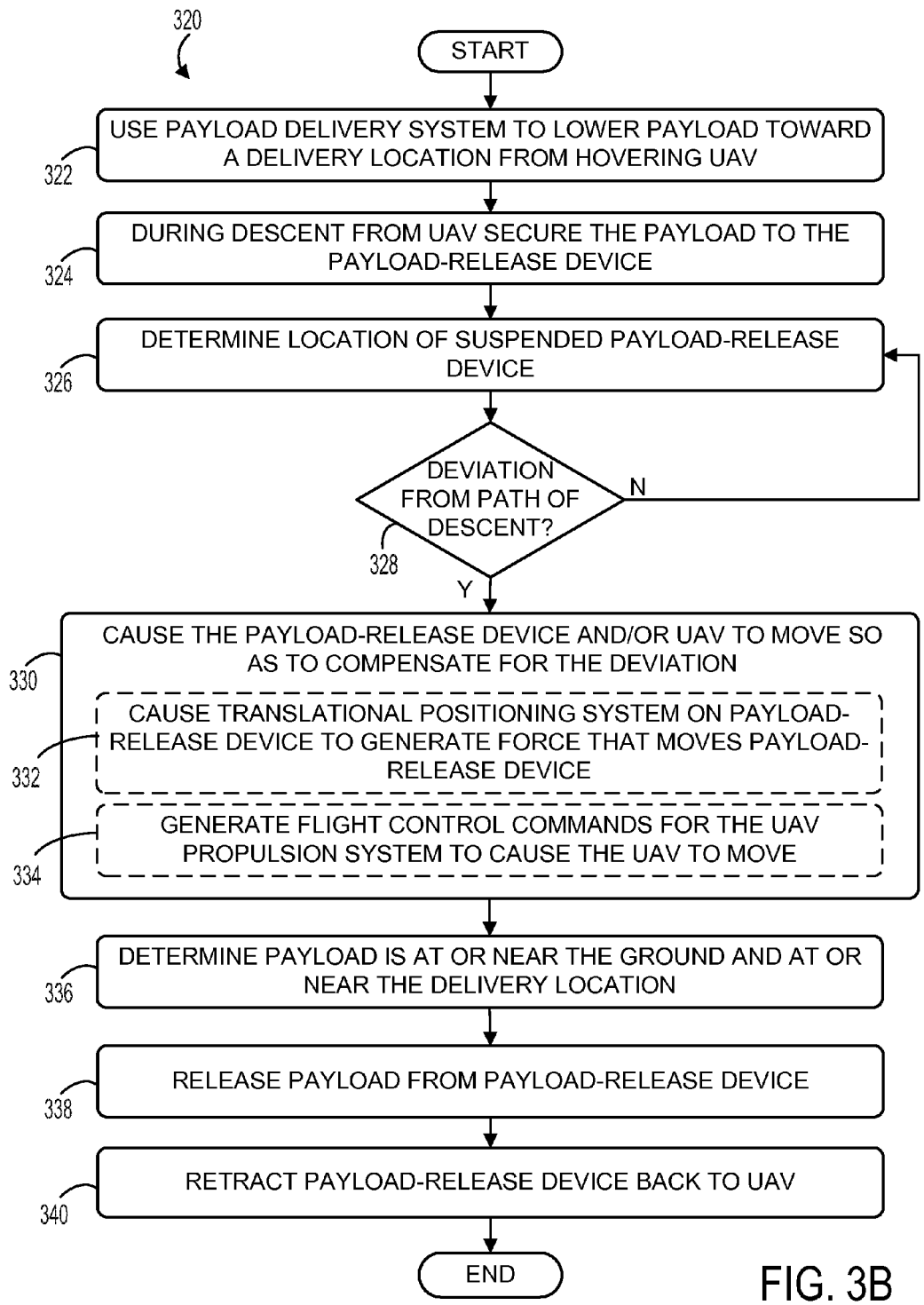

FIGS. 3A and 3B are flow charts illustrating processes that may be performed by a payload delivery system in connection with a delivery operation. FIG. 3A is a flowchart of an example process 300 that can be performed by a payload delivery system during a delivery operation. In particular, the process 300 involves determining a location of a payload-release device using an imaging system on a UAV to track features of the payload-release device. The process 300 may be performed using either of the payload delivery systems described in connection with FIGS. 1A-2F.

At block 302, a payload-release device is suspended from a hovering UAV. For example, the UAV may be hovering over a delivery location, and the payload-release device may be suspended from the hovering UAV by a tether. The payload-release device may then be lowered to the ground while securing a payload by a tether-deployment mechanism on the UAV.

At block 304, light sources on the payload-release device are caused to emit light toward the UAV. The light sources may be mounted on a top surface of the payload-release device such that the emitted light is directed toward the UAV. For example, the LEDs 252, 254 mounted on the top surface 214 of the payload-release device 200 may be used to emit light toward the UAV from which the device 200 is suspended.

At block 306, an imaging system on the UAV is used to obtain image data of the suspended payload release device. The imaging system may be mounted on the UAV so as to capture a field of view that includes the suspended payload-release device while the payload-release device is suspended from the UAV. The imaging system may include, for example, a camera mounted on a gimbal mount so as to substantially maintain a perspective and/or field of view of the imaging system with respect to the UAV. The imaging system may also be configured to detect light from the light sources on the payload-release device and distinguish that light from background light. For example, the imaging system may filter incoming light to selectively detect light at wavelength corresponding to the light sources on the payload-release device. For example, the light sources may emit light at an infrared or near infrared wavelength. Generally, the light sources may emit light at a range of different wavelengths of light (i.e., electromagnetic radiation). The imaging system may also be configured to detect modulation patterns of incoming light. As such, the light sources on the payload-release device may be emitted with a particular intensity modulation pattern to facilitate identification of the light sources by the imaging system and to better distinguish the light from the light sources from background light sources.

At block 308, image coordinates of the light source can be identified within the obtained image data. For example, the image data obtained by the imaging system can be analyzed to identify a pattern in the image data that corresponds to the light sources. The image analysis can include identifying a pattern within the obtained image, a particular wavelength, a particular modulation pattern, or another identifiable feature corresponding to the light sources mounted on the payload-release device. In some cases, the image analysis can also involve analyzing a subset of an obtained image frame that corresponds to an expected area of the payload-release device. The expected area may be estimated based on sensor data from other sources, such as an IMU, GPS, or other system on the payload-release device. In addition, the analysis may involve adjusting an expected intensity and/or scale of the pattern to be identified based on sensor data indicating a distance to the payload-release device from the imaging system. The distance to the payload-release device may be estimated from data from an IMU, altimeter, GPS, ranging system, etc. on the payload-release device, and/or based on an encoder that tracks the length of tether deployed from the UAV. Upon identifying a pattern of light within the obtained image data that corresponds to the light source, image coordinates of the pattern may be specified as pixel coordinates or another unit.

At block 310, a location of the payload-release device can be determined based on the identified image coordinates. For example, a particular image coordinate can be mapped to a line that projects from the imaging system primary aperture, within the field of view of the imaging system. Data indicating the altitude of the payload-release device and/or data indicating the distance from the imaging system primary aperture to the payload-release device can then be used to determine a point on that line at which the payload-release device is located. Altitude data may come from an altimeter or inertial motion unit or another position-related sensor on the payload-release device, for example. Distance data may come from a sensor that tracks the length of deployed tether, for example. Thus, a given pixel coordinate can be mapped to a three dimensional location, relative to the location of the UAV.

The image data could be used to estimate the distance between the payload-release device and the UAV (e.g., the altitude of the payload-release device). For instance, the image data may be analyzed to identify a pattern that corresponds to the spatial arrangement of the light sources on the top of the payload-release device. For example, for an arrangement of two or three (or more) lights sources, the actual spacing between each of the lights in the arrangement is known. The image can be analyzed to determine the separations between image coordinates corresponding to each light source (e.g., pixel distances) within the field of view of the imaging system. The distance between the points of each light source in image coordinates (e.g., pixel distances) can then be combined with the known physical separations to estimate the distance to the payload-release device. Thus, combining the known spacing information with the scale of the field of view of the camera may be used to estimate the distance to the payload-release device based on the apparent separation between the lights within the field of view of the camera. For instance, the closer together the lights appear in the field of the image, the further the payload-release device is from the camera, and vice versa. The current distance (or at least a rough distance range) to the payload-release device may be based on computing a ratio between the apparent separation between lights in the camera's field of view to a reference image coordinate separation that corresponds to reference distance.

Moreover, the image data may be used to determine an orientation of the payload-release device during descent. For example, while the payload-release device is suspended by the tether, the payload-release device may rotate (i.e., twist) around the axis defined by the tether. The pattern of light detected by the imaging system can be used to determine the rotation of the payload-release device. For example, if the payload-release device includes two light sources that are distinguishable from one another (e.g., by intensity modulation, wavelength, etc.), the positions of the two light sources in the image data can be mapped to an orientation of the payload-release device. Further, the payload-release device may include more than two light sources arranged in a rotation-asymmetric pattern. As such, the positions of the light sources may be determined based on the image data and the orientation of the payload-release device can be determined based on the pattern in which the light sources are arranged.

FIG. 3B is a flowchart of an example process 320 that can be performed by a payload delivery system during a delivery operation. In particular, the process 320 involves determining a location of a payload-release device and then correcting for deviations from a planned path of descent of the payload. The process 320 may be performed using either of the payload delivery systems described in connection with FIGS. 1A-2F.

At block 322, a payload delivery system is used to lower a payload from a hovering UAV. For example, the UAV may be hovering at a target location above a delivery location on the ground. The UAV can then use its retractable delivery system to lower the payload-release device, and the payload secured thereby, such as by unreeling the tether from a winch on the UAV. The payload-release device can include a retaining rod that can be alternately positioned in an engaged position, in which the retaining rod engages the payload, and a disengaged position, in which the retaining rod does not interfere with the payload as it is released. The retaining rod may engage the payload through a payload mount attachment of the payload (e.g., a structure with an aperture that enters a channel in the payload-release device). As such, in the disengaged position, the retaining rod does not engage the payload mount attachment.

At block 324, payload-release device is secured to the payload as the payload-release device (and the payload secured thereby) descends from the UAV. The payload-release device may therefore include an electromechanical component that can be alternately positioned in an engaged position, in which the component engages the payload so as to mechanically couple to the payload, and a disengaged position, in which the component does not prevent the payload from being released from the payload-release device. The payload-release device securing the payload may involve positioning a retaining rod so as to engage an aperture in a payload mount attachment, for example.

At block 326, the location of the suspended payload-release device is determined. Determining the location may involve the process 300 described in connection with FIG. 3A, for example. Additionally or alternatively, the location determination of block 326 may involve using sensor data from various sensors on the payload-release device and/or the UAV to determine the current location of the payload-release device. For instance, accelerometer data may be used to incrementally determine a path of the payload-release device as it descends from the UAV.

At block 328, a determination is made whether the payload-release device has deviated from a predetermined path of descent associated with the delivery location. The predetermined path of descent may be a straight path that is roughly normal to the ground and extends from the delivery location. Such a straight vertical path of descent may be predicted in the absence of wind or other effects that cause the payload-release device to experience forces transverse to the direction of tension in the tether. At block 328, a control system may evaluate whether the determined location of the payload-release device is within a threshold distance of the predetermined path of descent. The threshold distance may, in some cases, vary depending on the predicted effect on the eventual landing. For instance, a small distance from a predicted path of descent early in the descent (i.e., at a high altitude) may be determined to exceed the threshold deviation if the deviation is expected to result in a large offset in landing location. On the other hand, a small distance from the predicted path of descent when the payload is already near the ground may not exceed the threshold deviation.

In some cases, the predicted path of descent may vary from a straight vertical path of descent and may be based on sensors and/or communications indicating weather conditions, such as measurements of wind speed, etc. The predicted path of descent may then be a path of descent that is predicted to end at the desired delivery location given the atmospheric conditions. The predicted path of descent may also account for expected variations in wind speed at different altitudes. The predicted path of descent may also account for atmospheric effects due to structures in the vicinity of the delivery location, such as houses, trees, or other structures that may block the wind. In some cases, for example, the predicted path of descent may initially vary from a straight vertical path, at high altitudes, and then swing back toward a substantially straight vertical path, at altitudes below a wind block created by surrounding structures. The predicted path of descent for a given delivery location may therefore be based on real time data of the atmospheric conditions (e.g., wind speed sensors), data of the delivery location (e.g., image data used to recognize structures), and/or archival data (e.g., three dimensional maps of delivery locations, data from previous deliveries at similar or related locations, etc.).

If, at block 328, the location of the payload-release device is found to have deviated from the predetermined path of descent, the process 320 can continue at block 330. If, at block 328, the location of the payload-release device is not found to have deviated from the predetermined path of descent, the process 320 can continue at block 326, and the location of the payload-release device can be determined again before checking whether the determined location has deviated from the predetermined path of descent.

At block 330, the deviation from the predetermined path of descent can be accounted for by causing the payload-release device and/or the UAV to move so as to compensate for the deviation. Causing the payload-release device to move is discussed in connection with block 332, and causing the UAV to move is discussed in connection with block 334. Generally, a control system can be configured to determine a degree of movement to be performed by the payload-release device and/or the UAV based on a variety of factors, including the degree of deviation from the predetermined path of descent, atmospheric conditions, weight of the payload, constraints due to obstacles, etc.

At block 332, the payload-release device can be moved using a translational positioning system mounted to a housing of the payload-release device to generate force on the payload-release device via interaction with the surrounding atmosphere (e.g., an air propulsion system). For example, the translational positioning system may include thrusters, such as an arrangement of blades within a shroud that can rotate to generate thrust on the payload-release device that is transverse to the tension from the tether. In some cases, two thrusters may be reversible and may be arranged so as to generate thrust roughly transverse to one another and transverse to the direction of tension from the tether. Operating two such thrusters at respective speeds in respective directions allows for a range of different forces transverse to the direction of the tether to be applied to the payload-release device. The translational positioning system may additionally or alternatively include an air foil such as a wing or sail that can be positioned in different orientations so as to interact with the surrounding atmosphere to generate force on the payload-release device.

At block 334, the UAV can be moved by generating flight control commands for the UAV propulsion system that cause the UAV to move. In one example, the flight control commands may be generated to cause the UAV to traverse an offset that corresponds to an expected distance from a projected landing location of the payload and a target delivery location. In practice, the control system may estimate, based on the degree of deviation from the predetermined path of descent and other factors, a revised path of descent for the delivery location, and then the UAV can be moved to a location for the revised path of descent. Other examples are also possible, including an incremental approach in which the position of the UAV is repeatedly adjusted to compensate for deviations from an initial predetermined path of descent as the payload is lowered to the ground.

At block 336, the payload is determined to be at or near the ground and also at or near the delivery location. The determination may be made by a computing control system on the payload-release assembly and/or the UAV (or associated with the UAV). The determination may involve determining the location of the payload-release device (e.g., similar to block 326) and then determining whether the location is within a threshold distance of the delivery location. The determination may be based, at least in part, on sensor data from sensors on the payload-release device. For example, data from inertial motion sensor(s) included in the payload-release device can be analyzed to determine whether such data indicates that the payload and/or payload-release assembly underwent an impact with the ground. Upon detecting an acceleration sequence characteristic of a ground impact, the computing system(s) can determine that the payload is at or near the ground. Additionally or alternatively, the determination may be made in part based on altimeter sensor data, imaging data, tether reel encoder data, tether-tension sensor data, and/or UAV thrust sensor data. The tether-tension sensor data and/or UAV thrust sensor data can be used, for example, to determine the amount of weight suspended from the UAV by the tether. A sudden decrease in the amount of suspended weight may thus indicate that the payload is on the ground. Other techniques for determining that the payload is at or near the ground and at or near the delivery location are described above in connection with FIGS. 1A-1D.

At block 338, the payload can be released from the payload-release device. Releasing the payload may involve actuating an electromechanical component so as to move the component from a position in which the payload is engaged to a position in which the payload is not mechanically linked to the payload-release device. For instance, releasing the payload may involve moving a retaining rod from the engaged position to the disengaged position to thereby release the payload from the payload-release device.

At block 340, the payload-release device is refracted back to the UAV. For example, a tether-deployment mechanism, such as a winch or ratchet, can be operated to reel in the tether. The released payload remains on the ground, at the delivery location, as the payload-release device is retracted back to the UAV.

In practice, one or more of the operations described in connection with the processes 300 and 320 may be omitted or performed in a different order. Various combinations and/or variations of the processes 300 and 320 are therefore possible, and are included within the presently disclosed subject matter.

V. Example Operation Sequences

Figure 4A:
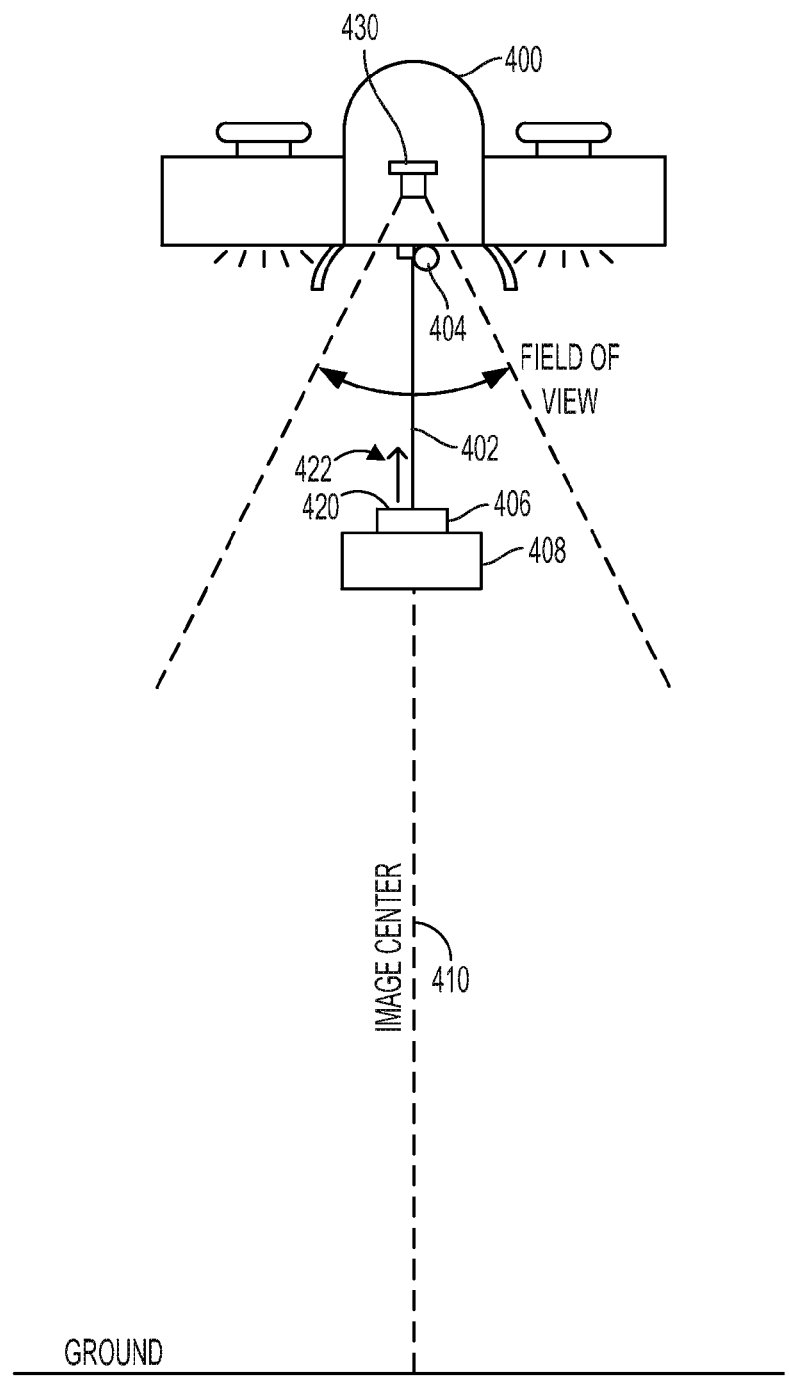
Figure 4B:
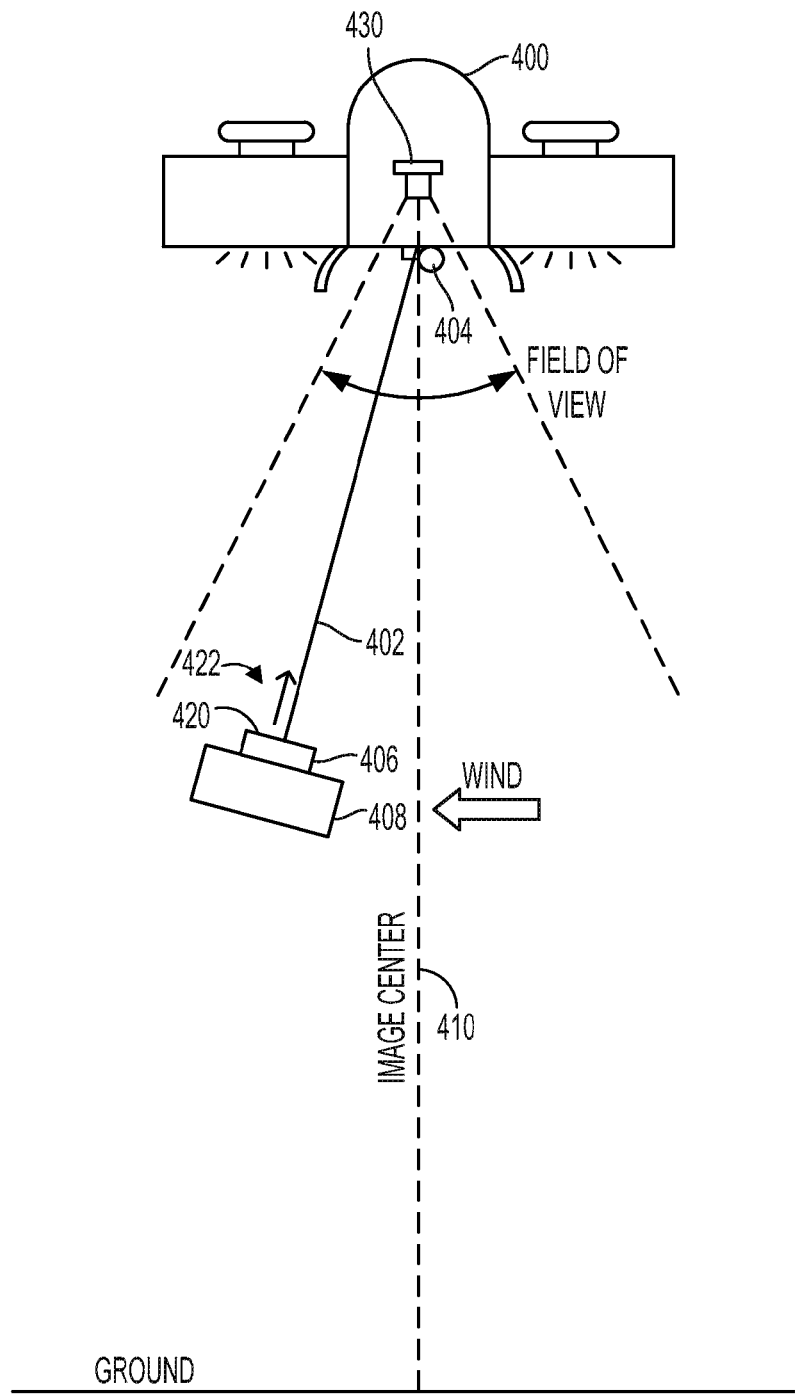

FIGS. 4A, 4B, and 4C illustrate stages of a delivery operation in which a location of the descending payload-release device is determined. FIG. 4A shows a UAV 400 hovering over the ground. A payload 408 is secured to a payload-release device 406 that is suspended from the UAV 400 by a tether 402. The tether 402 couples the payload-release device 406 to a tether-deployment mechanism 404. The payload-release device 406 includes tracking features 420 which emit and/or reflect light 422 toward the UAV 400 while the payload-release device is suspended via the tether 420. The UAV 400 includes an imaging system 430 that is arranged to obtain image data of a field of view that includes the suspended payload-release device 406. The imaging system 430 may be mounted to the UAV 400 with a gimbal mount or another stabilizing mount so as to maintain a perspective and/or field of view with respect to the UAV 400. As shown in FIG. 4A, the imaging system 430 may be arranged such that the payload-release device 406 is roughly at an image center 410 of obtained images when the payload-release device 406 is suspended straight vertically (e.g., in the absence of wind).

FIG. 4B shows the payload-release device 406 experiencing a force transverse to the direction of tension in the tether 402 (e.g., due to wind). As a result, the payload-release device 406 and the payload 408 are offset from the image center 410 when imaged by the imaging system 430. The tracking features 420 can still emit and/or reflect light 422 toward the imaging system 430 to allow the image data from the imaging system 430 to be used to track in the location of the suspended payload-release device 406.

FIG. 4C represents the determination of the location of the payload-release device from the image data. The image data is used to identify an image coordinate at which the image includes a pattern corresponding to the tracking features 420. The image coordinate corresponding to the tracking features 420 is then mapped to a line 432 that projects outward from the primary aperture of the imaging system 430, with an angle based on the image coordinates. As shown in FIG. 4C, the projected line 432 is at an angle θ from the image center 410, and intersects the payload-release device 406. The identified image coordinates thus indicate that the payload-release device 406 (or the tracking features 420) is located along the projected line 432. In addition, data indicating an altitude of the payload-release device 406 and/or a length of the deployed tether 402 can be used to determine the location along the projected line 432 at which the payload-release device 406 is located.

FIG. 4D illustrates an example system 440 for determining a location of a descending payload-release device. The system 440 includes a control system 454 which receives image data 450 and altimeter data 452 and uses that data as a basis to determine location data 456. The control system 454 may be implemented by computing systems located on the payload-release device 406 and/or the UAV 400 that is configured to perform the process 300 described in connection with FIG. 3A. The image data 450 can be generated by the imaging system 430, and the altimeter data 452 can be generated by a sensor on the payload-release device 406, for example. Other examples are possible.

A graphical representation of the image data 450 is illustrated in frame 441. The frame 441 can correspond to the field of view of the imaging system 430. The frame 441 depicts an image center 442 (represented by the "X"), and image representations of the payload 448 and the tracking features on the payload-release device (e.g., light sources 444, 446). The control system 454 can analyze the image data 450 to identify the image coordinates at which the tracking features are depicted. The location can then be determined based on an intersection between a projected line corresponding to those image coordinates and an altitude of the payload-release device 406, which can be indicated by the altimeter data 452.

Figure 5A:
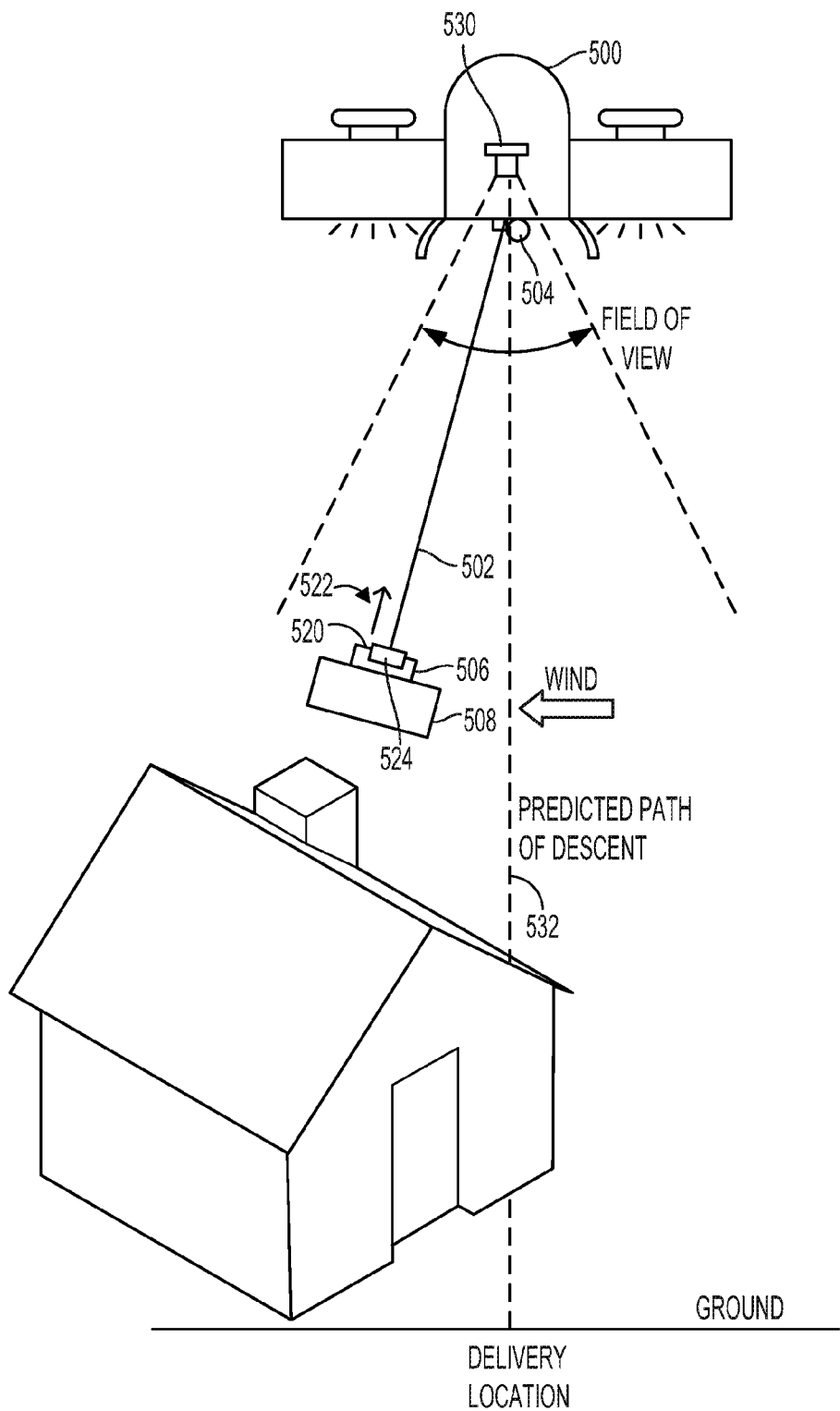
FIGS. 5A, 5B, and 5C illustrate stages of a delivery operation in which a location of the descending payload-release device is adjusted, according to example embodiments.
Figure 5B:
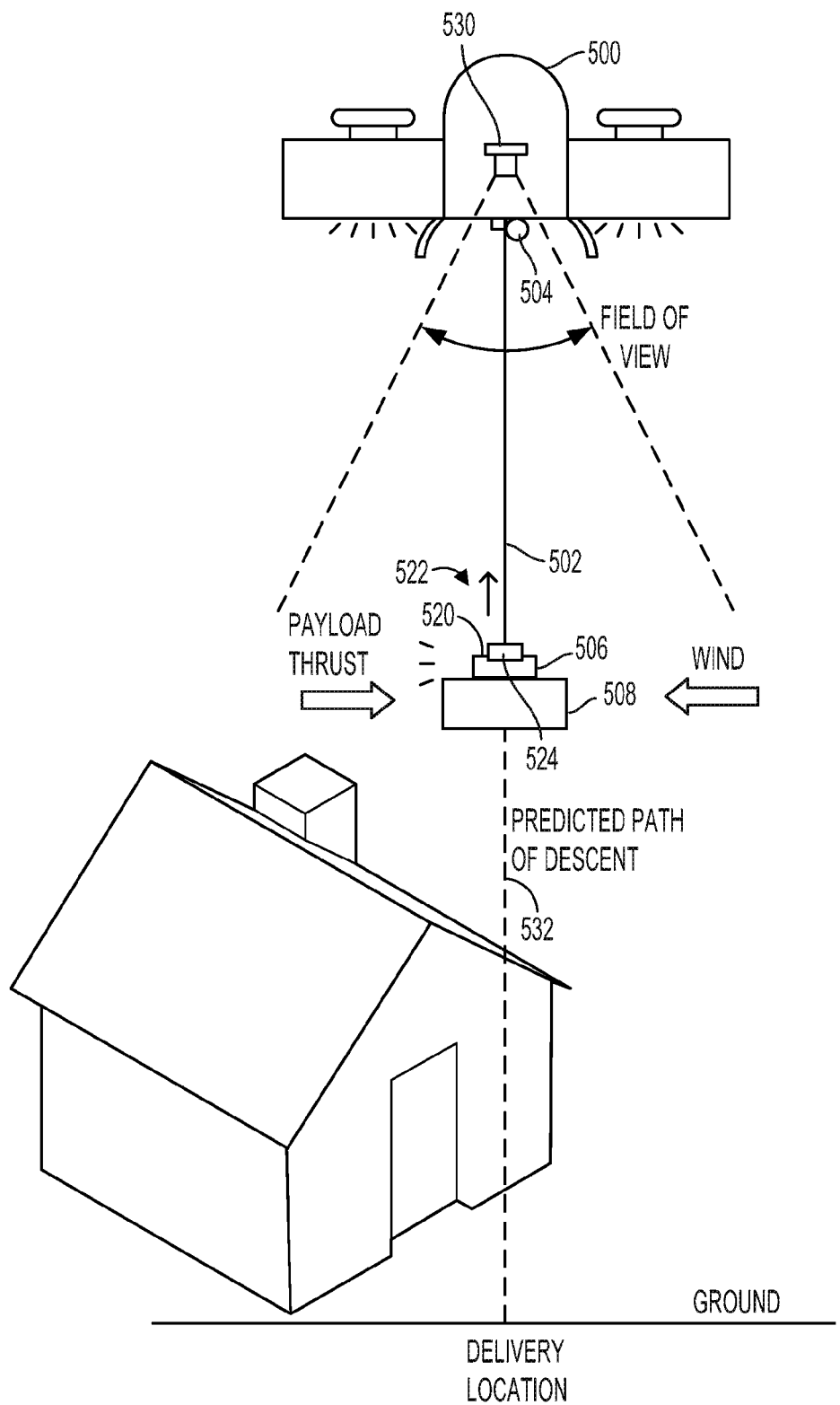
Figure 5C:
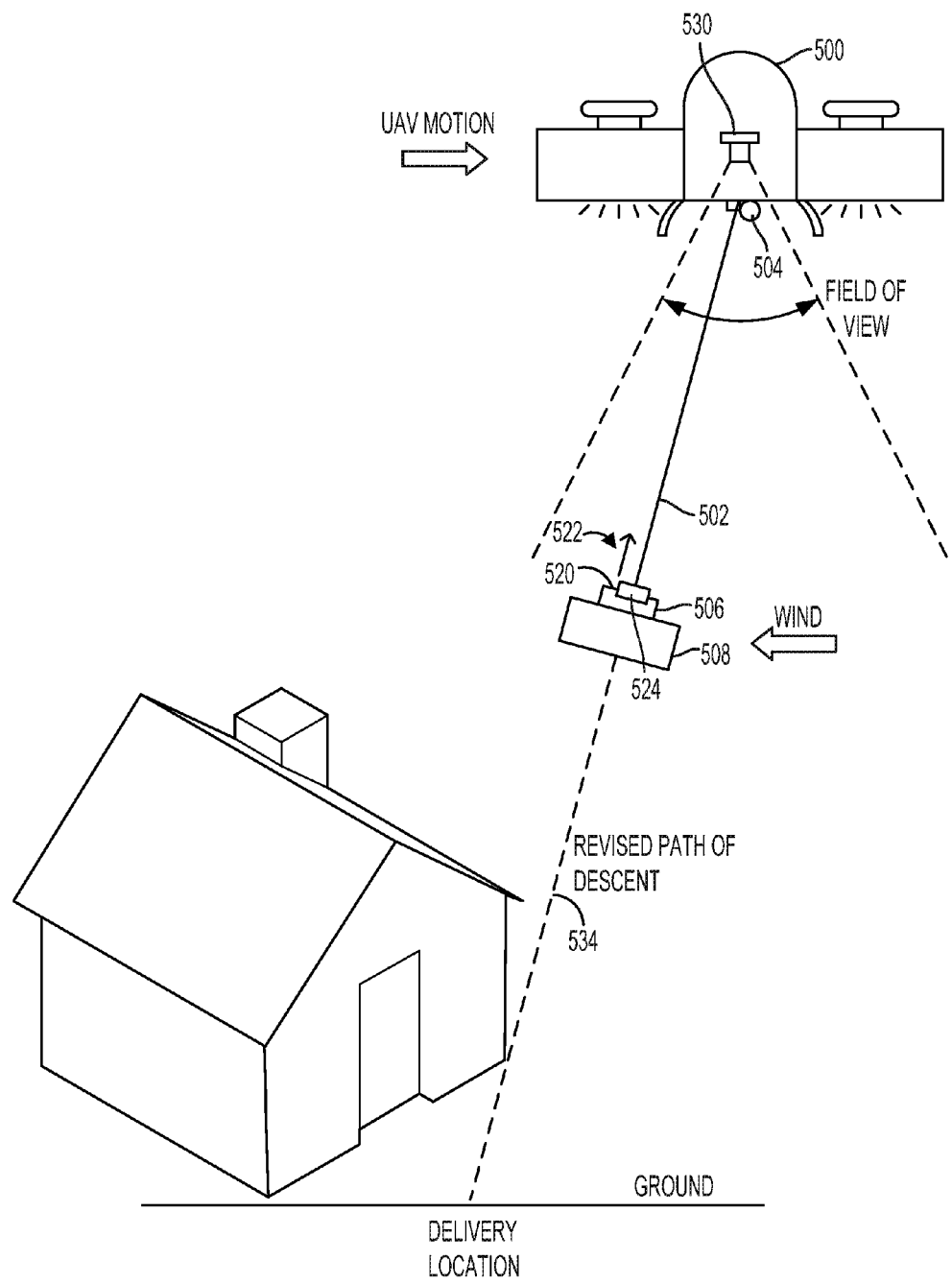

FIGS. 5A, 5B, and 5C illustrate stages of a delivery operation in which a location of the descending payload-release device is adjusted. FIG. 5A shows a UAV 500 hovering over a delivery location. A payload 508 is secured to a payload-release device 506 that is suspended from the UAV 500 by a tether 502. The tether 502 couples the payload-release device 506 to a tether-deployment mechanism 504. The payload-release device 506 includes tracking features 520 which emit and/or reflect light 522 toward the UAV 500 while the payload-release device is suspended via the tether 520. The UAV 500 includes an imaging system 530 that is arranged to obtain image data of a field of view that includes the suspended payload-release device 506. The imaging system 530 may be mounted to the UAV 500 with a gimbal mount or another stabilizing mount so as to maintain a perspective and/or field of view with respect to the UAV 500. The imaging system 530 may be arranged such that an image center 410 of obtained images is approximately vertically downward from the UAV 500. The payload-release device 506 can also include a translational positioning system 524, which may include thrusters and/or air foils for generating force on the payload-release device 506 via interaction with the surrounding atmosphere.

As shown in FIG. 5A, a predicted path of descent 532 of the payload-release device may be approximately straight vertically downward to the delivery location. However, during descent, wind can apply force to the payload-release device 506 (and the payload 508) in a direction transverse to the tether 502, which causes the payload-release device to move in the direction of the applied force, swinging on the tether 502. Thus, the payload-release device 506 has deviated from the predetermined path of descent 532 associated with the delivery location.

FIG. 5B shows the payload-release device 506 (and the payload 508) being moved back to the predicted path of descent 532. The translational positioning system 524 is used to generate a thrust that counters the wind. As a result, the payload-release device 506 (and payload 508) can move back to the predetermined path of descent 532 and continue descending toward the delivery location.

FIG. 5C shows the payload-release device 506 (and the payload 508) being lowered along a revised path of descent 534. To account for the wind, the UAV moves in a direction opposite the force of wind. The effect of the wind can be used to determine the revised path of descent 534 for the delivery location, and the UAV 500 can move to a location along the revised path of descent 534. From the new location of the UAV 500, the payload-release device 506 can descend to the delivery location.

Figure 5D:
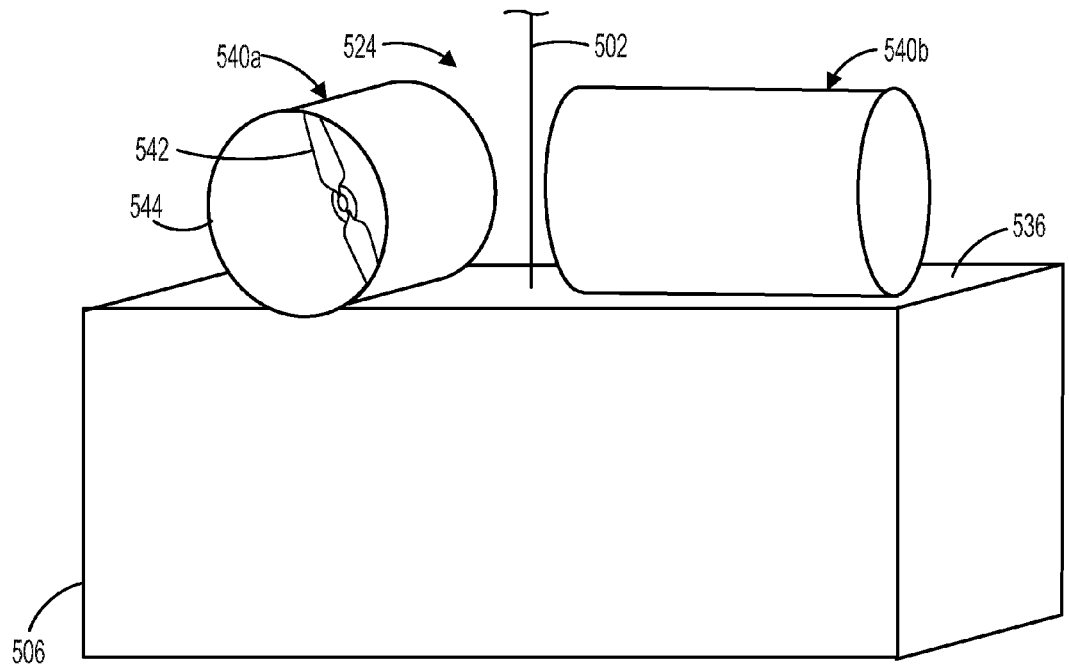
FIG. 5D illustrates an example payload-release device including thrusters mounted thereon, according to an example embodiment.

FIG. 5D illustrates the example translational positioning system 524, which may also be referred to herein as an air propulsion system. The positioning control system 524 can include thrusters 540a, 540b mounted to the housing the of the payload-release device 506. As shown in FIG. 5D, the thrusters 540a, 540b may be mounted on a top surface 536 of the housing, nearest the tether 502, although other locations are possible. The thruster 540a can include a propeller 542 situated within a shroud 544 (e.g., a fan). The propeller can include two or more blades that rotate about an axis at least partially transverse to the direction of the tether 502. The blades of the propeller 542 can be angled with respect to one another so as to generate thrust in a direction along the axis of rotation. Moreover, the propeller 542 may be reversible such that the thruster 540a can be used to generate thrust in opposing directions depending on the direction of rotation of the propeller 542. The thruster 540b can be similar to the thruster 540a, but oriented approximately transverse to the thruster 540b. By operating the two thrusters at respective speeds and in respective directions a combination of forces can be applied to the payload-release device 506 in directions transverse to the direction of tension in the tether 502.

Figure 5E:
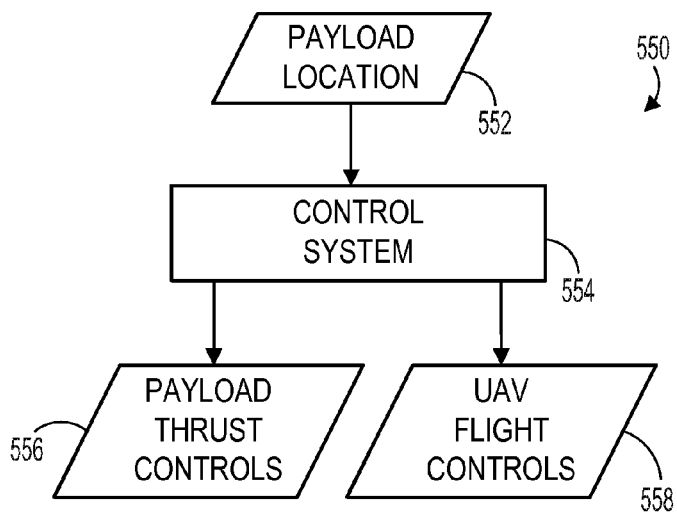
FIG. 5E illustrates an example system for adjusting a location of a descending payload-release device, according to an example embodiment.

FIG. 5E illustrates an example system 55 for adjusting a location of a descending payload-release device. The system 550 includes a control system 554 which receives payload location data 552 and uses that data as a basis to determine payload thrust controls 556 and/or UAV flight controls 558. The control system 554 may be implemented by computing systems located on the payload-release device 506 and/or the UAV 500 that is configured to perform the process 320 described in connection with FIG. 3B. The payload location data 552 can be generated by an image-based position tracking system similar to the system 450 described in connection with FIGS. 4A-4D. Additionally or alternatively, the payload location data 552 may be based on position sensors on the payload-release device, such as accelerometer data that is used to incrementally determine a path traversed by the payload-release device during descent from the UAV. The payload thrust controls 556 may involve electronic signals that cause one or both thrusters 540a, 540b to generate force on the payload-release device in a particular direction that compensates for an offset from the predetermined path of descent, for example. The UAV flight controls 558 may involve electronic signals that cause a propulsion system of the UAV 500 to operate so as to cause the UAV 500 to traverse a desired path that compensates for an offset from the predetermined path of descent, for example.

VI. Example UAVs

FIGS. 6A, 6B, 6C, and 6D are simplified illustrations of example unmanned aerial vehicles, according to example embodiments. Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

Figure 6A:
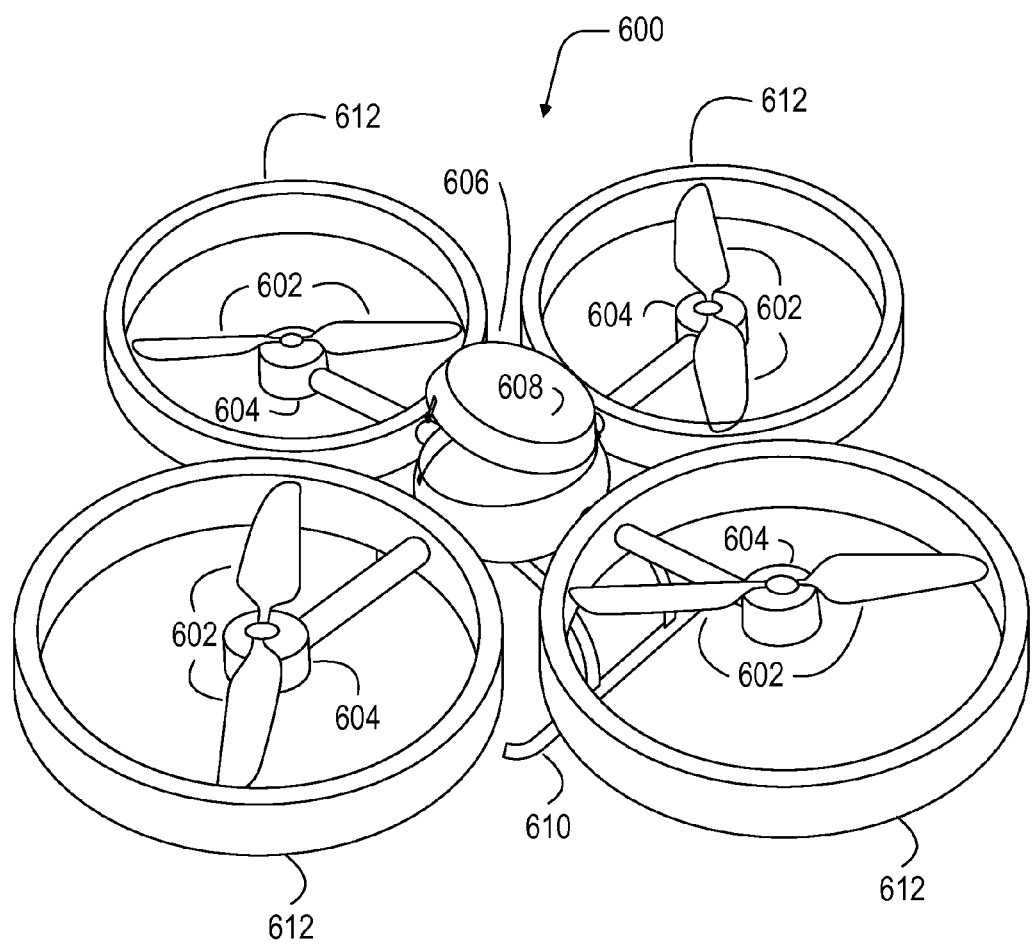
FIGS. 6A, 6B, 6C, and 6D are simplified illustrations of example unmanned aerial vehicles, according to example embodiments.

FIG. 6A is a simplified illustration of a UAV 600, according to an example embodiment. In particular, FIG. 6A shows an example of a rotorcraft 600 that is commonly referred to as a multicopter. Multicopter 600 may also be referred to as a quadcopter, as it includes four rotors 602. It should be understood that example embodiments may involve rotorcraft with more or less rotors than multicopter 600. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 600 in greater detail, the four rotors 602 provide propulsion and maneuverability for the multicopter 600. More specifically, each rotor 602 includes blades that are attached to a motor 604. Configured as such the rotors may allow the multicopter 600 to take off and land vertically, to maneuver in any direction, and/or to hover. Furthermore, the pitch of the blades may be adjusted as a group and/or differentially, and may allow a multicopter 602 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 600. Blade-pitch adjustment may be particularly useful for rotorcraft with substantial inertia in the rotors and/or drive train, but is not limited to such rotorcraft Additionally or alternatively, multicopter 600 may propel and maneuver itself adjust the rotation rate of the motors, collectively or differentially. This technique may be particularly useful for small electric rotorcraft with low inertia in the motors and/or rotor system, but is not limited to such rotorcraft.

Multicopter 600 also includes a central enclosure 606 with a hinged lid 608. The central enclosure may house, for example, control electronics such as an inertial measurement unit (IMU) and/or an electronic speed controller, batteries, other sensors, and/or a payload, among other possibilities.

The illustrative multicopter 600 also includes landing gear 610 to assist with controlled take-offs and landings. In other embodiments, multicopters and other types of UAVs without landing gear are also possible.

In a further aspect, multicopter 600 includes rotor protectors 612. Such rotor protectors 612 can serve multiple purposes, such as protecting the rotors 602 from damage if the multicopter 600 strays too close to an object, protecting the multicopter 600 structure from damage, and protecting nearby objects from being damaged by the rotors 602. It should be understood that in other embodiments, multicopters and other types of UAVs without rotor protectors are also possible. Further, rotor protectors of different shapes, sizes, and function are possible, without departing from the scope of the invention.

A multicopter 600 may control the direction and/or speed of its movement by controlling its pitch, roll, yaw, and/or altitude. To do so, multicopter 600 may increase or decrease the speeds at which the rotors 602 spin. For example, by maintaining a constant speed of three rotors 602 and decreasing the speed of a fourth rotor, the multicopter 600 can roll right, roll left, pitch forward, or pitch backward, depending upon which motor has its speed decreased. Specifically, the multicopter may roll in the direction of the motor with the decreased speed. As another example, increasing or decreasing the speed of all rotors 602 simultaneously can result in the multicopter 600 increasing or decreasing its altitude, respectively. As yet another example, increasing or decreasing the speed of rotors 602 that are turning in the same direction can result in the multicopter 600 performing a yaw-left or yaw-right movement. These are but a few examples of the different types of movement that can be accomplished by independently or collectively adjusting the RPM and/or the direction that rotors 602 are spinning.

Figure 6B:
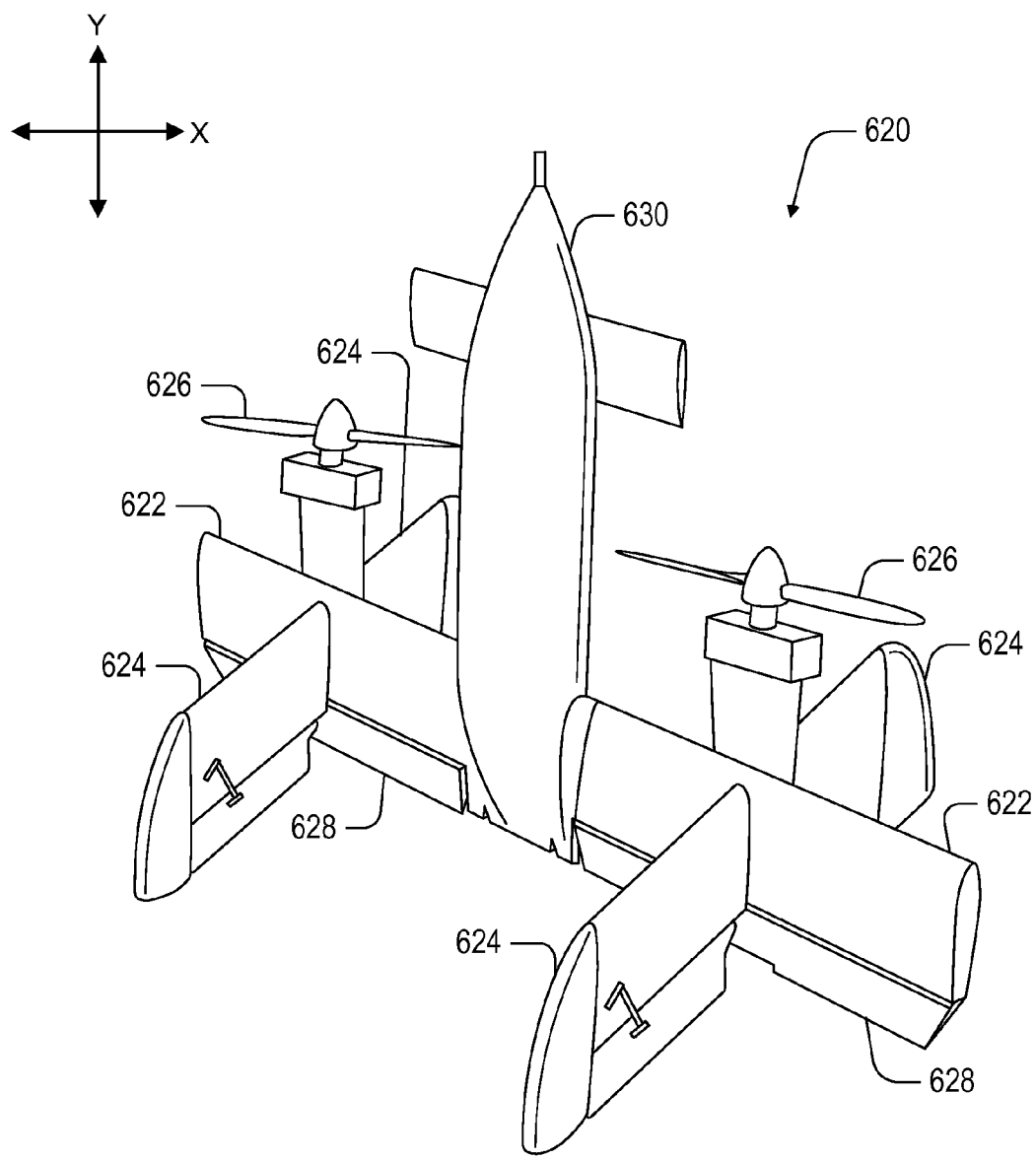

FIG. 6B is a simplified illustration of a UAV 620, according to an example embodiment. In particular, FIG. 6B shows an example of a tail-sitter UAV 620. In the illustrated example, the tail-sitter UAV 620 has fixed wings 622 to provide lift and allow the UAV to glide horizontally (e.g., along the x-axis, in a position that is approximately perpendicular to the position shown in FIG. 6B). However, the fixed wings 622 also allow the tail-sitter UAV 620 take off and land vertically on its own.

For example, at a launch site, tail-sitter UAV 620 may be positioned vertically (as shown) with fins 624 and/or wings 622 resting on the ground and stabilizing the UAV 620 in the vertical position. The tail-sitter UAV 620 may then take off by operating propellers 626 to generate the upward thrust (e.g., a thrust that is generally along the y-axis). Once at a suitable altitude, the tail-sitter UAV 620 may use its flaps 628 to reorient itself in a horizontal position, such that the fuselage 630 is closer to being aligned with the x-axis than the y-axis (e.g., aligned parallel to the ground). Positioned horizontally, the propellers 626 may provide forward thrust so that the tail-sitter UAV 620 can fly in a similar manner as a typical airplane.

Variations on the illustrated tail-sitter UAV 620 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 620 are also possible.

As noted above, some embodiments may involve other types of UAVs, in addition or in the alternative to multicopters. For instance, FIGS. 6C and 6D are simplified illustrations of other types of UAVs, according to example embodiments.

Figure 6C:
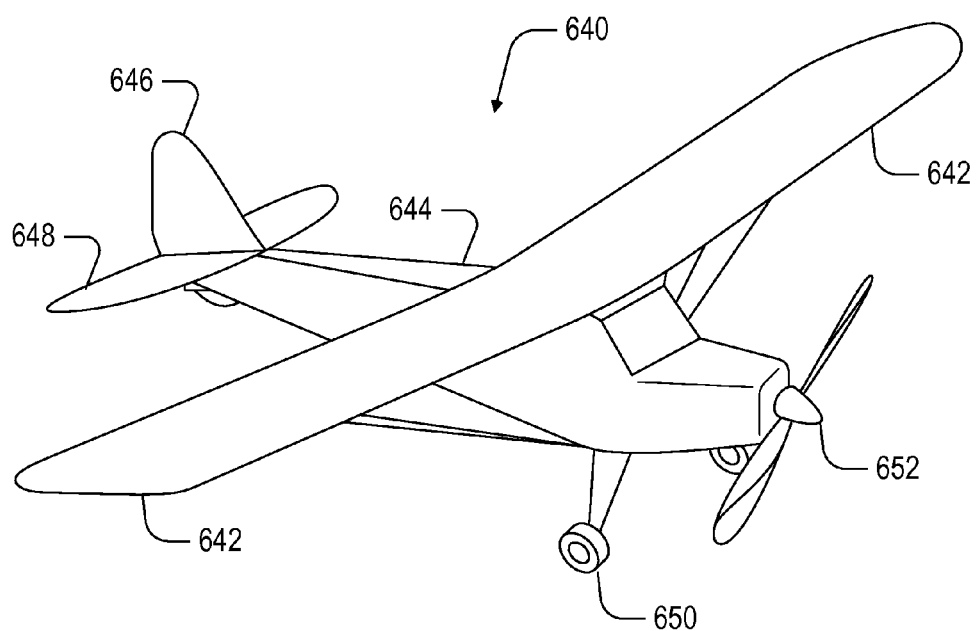

In particular, FIG. 6C shows an example of a fixed-wing aircraft 640, which may also be referred to as an airplane, an aeroplane, or simply a plane. A fixed-wing aircraft 640, as the name implies, has stationary wings 642 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 6C depicts some common structures used in a fixed-wing aircraft 640. In particular, fixed-wing aircraft 640 includes a fuselage 644, two horizontal wings 642 with an airfoil-shaped cross section to produce an aerodynamic force, a vertical stabilizer 646 (or fin) to stabilize the plane's yaw (turn left or right), a horizontal stabilizer 648 (also referred to as an elevator or tailplane) to stabilize pitch (tilt up or down), landing gear 650, and a propulsion unit 652, which can include a motor, shaft, and propeller.

Figure 6D:
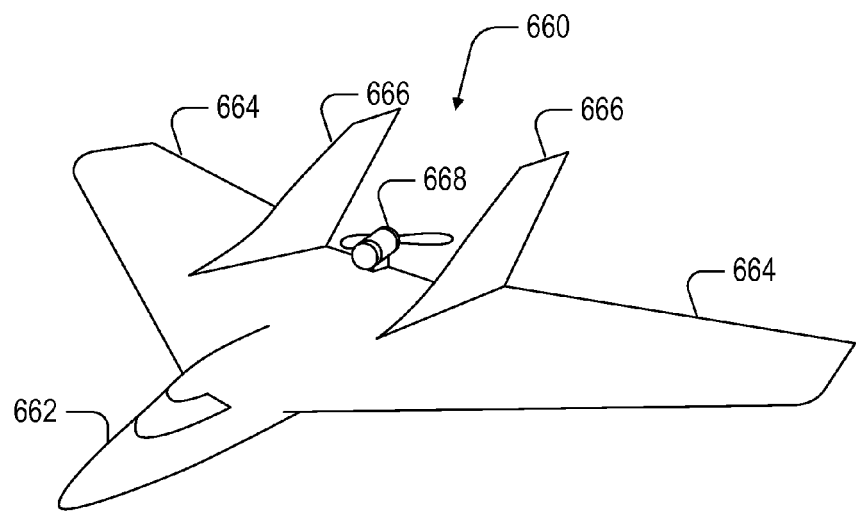

FIG. 6D shows an example of an aircraft 660 with a propeller in a pusher configuration. The term "pusher" refers to the fact that the propulsion unit 668 is mounted at the back of the aircraft and "pushes" the vehicle forward, in contrast to the propulsion unit being mounted at the front of the aircraft. Similar to the description provided for FIG. 6C, FIG. 6D depicts common structures used in the pusher plane: a fuselage 662, two horizontal wings 664, vertical stabilizers 666, and a propulsion unit 668, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide remote medical support. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

VII. Example Components of a UAV

Figure 7:
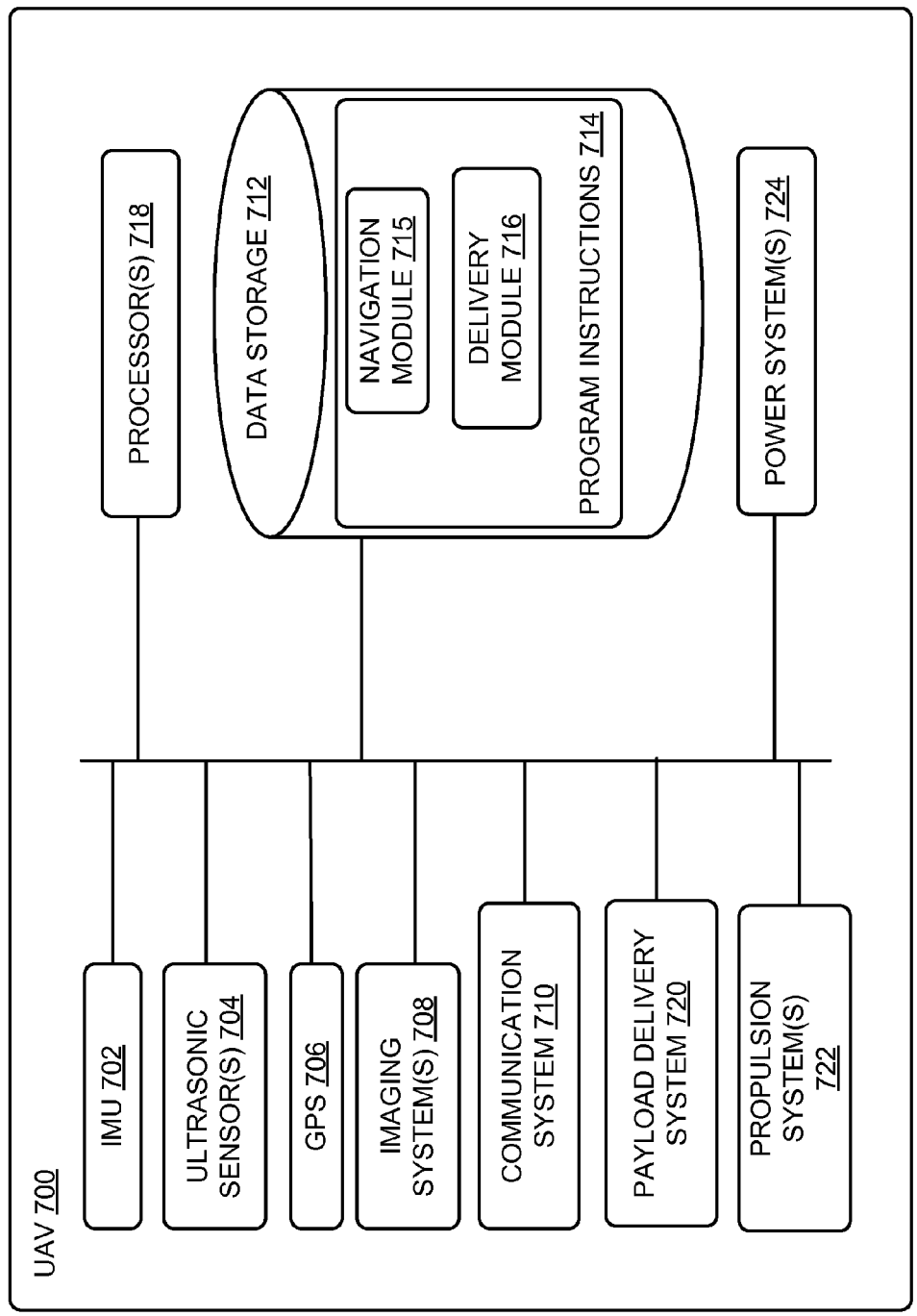
FIG. 7 is a simplified block diagram illustrating components of a UAV, according to an example embodiment.

FIG. 7 is a simplified block diagram illustrating components of a UAV 700, according to an example embodiment. UAV 700 may take the form of or be similar in form to one of the UAVs 600, 620, 640, and 660 shown in FIGS. 6A-6D. However, UAV 700 may also take other forms.

UAV 700 may include various types of sensors, and may include a computing system configured to provide the functionality described herein. In the illustrated embodiment, the sensors of UAV 700 include an inertial measurement unit (IMU) 702, ultrasonic sensor(s) 704, GPS 706, imaging system(s) 708, among other possible sensors and sensing systems. The UAV 700 also includes a communication system 710, a payload delivery system 720, and propulsion system(s) 722.

The UAV 700 can include one or more processors 718. The processor(s) 718 may include a general-purpose processor or a special purpose processor (e.g., digital signal processors, application specific integrated circuits, etc.). The one or more processors 718 can be configured to execute computer-readable program instructions 714 that are stored in the data storage 712 and are executable to provide the functionality of a UAV described herein.

The data storage 712 may include or take the form of one or more computer-readable storage media that can be read or accessed by at least one processor 718. The one or more computer-readable storage media can include volatile and/or non-volatile storage components, such as optical, magnetic, organic or other memory or disc storage, which can be integrated in whole or in part with at least one of the one or more processors 718. In some embodiments, the data storage 712 can be implemented using a single physical device (e.g., one optical, magnetic, organic or other memory or disc storage unit), while in other embodiments, the data storage 712 can be implemented using two or more physical devices.

As noted, the data storage 712 can include computer-readable program instructions 714 and perhaps additional data, such as diagnostic data of the UAV 700. The program instructions 714 may be configured to cause the UAV 700 to perform or facilitate some or all of the UAV functionality described herein. For instance, in the illustrated embodiment, program instructions 714 include a navigation module 715 and an automated delivery module 716. The navigation module 715 can be a set of program instructions that, when executed by the processor(s) 718, generate flight commands to operate the propulsion system(s) 722 so as to cause the UAV 700 to navigate to a particular location and/or along a particular flight path. The delivery module 716 can be a set of program instructions that, when executed by the processor(s) 718, operate the payload delivery system 720 to lower a payload to the ground and release the payload. The delivery module 716 may also function to cause the UAV 700 to receive communication(s) from a remote operator indicative of a particular target location at which to deliver the payload and/or an authorization to initiate delivery and/or retraction of the payload delivery system 720. Other functions are also possible, including functions of the UAVs and payload delivery systems described above in connection with FIGS. 1-5.

A. Sensors

In an illustrative embodiment, IMU 702 may include both an accelerometer and a gyroscope, which may be used together to determine the orientation, position, and/or elevation of the UAV 700. In particular, the accelerometer can measure the orientation of the UAV 700 with respect to earth, while the gyroscope measures the rate of rotation around an axis. IMUs are commercially available in low-cost, low-power packages. For instance, an IMU 702 may take the form of or include a miniaturized MicroElectroMechanical System (MEMS) or a NanoElectroMechanical System (NEMS). Other types of IMUs may also be utilized.

An IMU 702 may include other sensors, in addition to accelerometers and gyroscopes, which may help to better determine position and/or help to increase autonomy of the UAV 700. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 700, slight errors in measurement may compound over time and result in a more significant error. However, an example UAV 700 may be able mitigate or reduce such errors by using a magnetometer to measure direction. One example of a magnetometer is a low-power, digital 3-axis magnetometer, which can be used to realize an orientation independent electronic compass for accurate heading information based on the Earth's magnetic field. However, other types of magnetometers may be utilized as well.

UAV 700 may also include a pressure sensor or barometer, which can be used to determine the altitude of the UAV 700. Alternatively, other sensors, such as sonic altimeters or radar altimeters, can be used to provide an indication of altitude, which may help to improve the accuracy of and/or prevent drift of an IMU.

In a further aspect, UAV 700 may include one or more sensors that allow the UAV to sense objects in the environment. For instance, in the illustrated embodiment, UAV 700 includes ultrasonic sensor(s) 704. Ultrasonic sensor(s) 704 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 700 also includes a GPS receiver 706. The GPS receiver 706 may be configured to provide data that is typical of well-known GPS systems, such as the GPS coordinates of the UAV 700. Such GPS data may be utilized by the UAV 700 for various functions. For example, the UAV 700 may use its GPS receiver 706 to help navigate to a target GPS location. In some scenarios a target GPS location may be based in part on a database that associates GPS coordinates with street addresses or may be based in part on GPS coordinates obtained from a mobile device. Other examples are also possible.

UAV 700 may also include one or more imaging system(s) 708. For example, one or more still and/or video cameras may be utilized by a UAV 700 to capture image data from the UAV's environment. As a specific example, charge-coupled device (CCD) cameras or complementary metal-oxide-semiconductor (CMOS) cameras can be used with unmanned vehicles. Such imaging sensor(s) 708 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 700 may use its one or more imaging system 708 to help in determining location. For example, UAV 700 may capture imagery of its environment and compare it to what it expects to see in its environment given current estimated position (e.g., its current GPS coordinates), and refine its estimate of its position based on this comparison.

In a further aspect, UAV 700 may include one or more microphones. Such microphones may be configured to capture sound from the UAVs environment. Other environmental sensors are also possible.

B. Navigation and Location Determination

The navigation module 715 may provide functionality that allows the UAV 700 to, e.g., move about in its environment and reach a desired location. To do so, the navigation module 715 may control the altitude and/or direction of flight by controlling the mechanical features of the UAV that affect flight (e.g., rotors 602 of UAV 600).

In order to navigate the UAV 700 to a target location, a navigation module 715 may implement various navigation techniques, such as map-based navigation and localization-based navigation, for instance. With map-based navigation, the UAV 700 may be provided with a map of its environment, which may then be used to navigate to a particular location on the map. With localization-based navigation, the UAV 700 may be capable of navigating in an unknown environment using localization. Localization-based navigation may involve a UAV 700 building its own map of its environment and calculating its position within the map and/or the position of objects in the environment. For example, as a UAV 700 moves throughout its environment, the UAV 700 may continuously use localization to update its map of the environment. This continuous mapping process may be referred to as simultaneous localization and mapping (SLAM). Other navigation techniques may also be utilized.

In some embodiments, the navigation module 715 may navigate using a technique that relies on waypoints. In particular, waypoints are sets of coordinates that identify points in physical space. For instance, an air-navigation waypoint may be defined by a certain latitude, longitude, and altitude. Accordingly, navigation module 715 may cause UAV 700 to move from waypoint to waypoint, in order to ultimately travel to a final destination (e.g., a final waypoint in a sequence of waypoints).

In a further aspect, navigation module 715 and/or other components and systems of UAV 700 may be configured for "localization" to more precisely navigate to the scene of a medical situation or other target location. More specifically, it may be desirable in certain situations for a UAV to be close to the person in need of medical support (e.g., within reach of the person), so as to properly provide medical support to the person. To this end, the UAV 700 may use a two-tiered approach in which it uses a more-general location-determination technique to navigate to a target area, and then use a more-refined location-determination technique to identify and/or navigate to the target location within the target area.

In an alternative arrangement, a navigation module may be implemented at a remote computing device (e.g., a computing device associated with a remote operator), which communicates wirelessly with the UAV 700. The remote computing device may receive data indicating the operational state of the UAV 700, sensor data from the UAV 700 that allows it to assess the environmental conditions being experienced by the UAV 700, and/or location information for the UAV 700. Provided with such information, the remote computing device may determine altitudinal and/or directional adjustments that should be made by the UAV 700 and/or may determine how the UAV should adjust its mechanical features (e.g., rotors 602 of UAV 600) in order to effectuate such movements. The remote computing system may then communicate such adjustments to the UAV 700 so it can move in the determined manner. Such commands to the electromechanical propulsion systems 722 of the UAV 700 may be referred to herein as flight-control commands, whether generated by a remote computing system or by the navigation module 715 on the UAV 700.

C. Payload Delivery

The payload delivery module 716 may provide functionality that allows the UAV 700 to autonomously or semi-autonomously lower a payload to the ground and release the payload, thereby effecting delivery of the payload on the ground. In practice, the payload delivery module 716 may be a set of program instructions that generates commands to electromechanical components and/or control systems of the payload delivery system 720 (e.g., the payload delivery system 110 of UAV 100).

The payload delivery system 720 may include aspects that selectively secure and release a payload (e.g., the payload-release device 106), and that selectively lower the payload to the ground (e.g., the tether-deployment mechanism 104 and tether 102). In some cases, the payload may be lowered to the ground using a retractable payload-release device that is secured to the payload during descent and that includes sensors to facilitate monitoring of the payload as it descends from the UAV 700. The payload-release device may, for example, communicate information from an inertial measurement unit and/or altimeter via a wireless connection with the UAV 700. Data from such sensors on the payload-release device can then be used by the payload delivery module 716 to determine when the payload and/or the payload-release device have reached the ground (e.g., based on accelerometer data indicating impact with the ground). Data from the sensors can also be used to determine whether the payload, payload-release device, and/or tether may have become stuck in an obstacle such as a tree or fence, or otherwise interfered with by a vehicle or perhaps a pedestrian.

In addition, the payload delivery module 716 can function to cause the payload-release assembly to ascend/descend at rates selected to encourage an intuitive, safe, and efficient interaction between the payload delivery system and people on the ground, as described above. Additionally or alternatively, the payload delivery module 716 can cause a bystander communication module to generate cues for perception by people on the ground during the delivery operation as described above. Other functionality of the payload delivery system 720 (and the payload delivery module 716) may include functions of the payload delivery systems described above in connection with FIGS. 1-5.

D. Communication Systems

In a further aspect, UAV 700 includes one or more communication systems 710. The communications systems 710 may include one or more wireless interfaces and/or one or more wireline interfaces, which allow UAV 700 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 700 may include communication systems 710 that allow for both short-range communication and long-range communication. For example, the UAV 700 may be configured for short-range communications using Bluetooth and for long-range communications under a CDMA protocol. In such an embodiment, the UAV 700 may be configured to function as a "hot spot;" or in other words, as a gateway or proxy between a remote support device and one or more data networks, such as cellular network and/or the Internet. Configured as such, the UAV 700 may facilitate data communications that the remote support device would otherwise be unable to perform by itself.

For example, UAV 700 may provide a WiFi connection to a remote device, and serve as a proxy or gateway to a cellular service provider's data network, which the UAV 700 might connect to under an LTE or a 3G protocol, for instance. The UAV 700 could also serve as a proxy or gateway to a high-altitude balloon network, a satellite network, or a combination of these networks, among others, which a remote device might not be able to otherwise access.

E. Power Systems

In a further aspect, UAV 700 may include power system(s) 724. A power system 724 may include one or more batteries for providing power to the UAV 700. In one example, the one or more batteries may be rechargeable and each battery may be recharged via a wired connection between the battery and a power supply and/or via a wireless charging system, such as an inductive charging system that applies an external time-varying magnetic field to an internal battery.

F. Payloads

UAV 700 may employ various systems and configurations in order to transport items. In the illustrated embodiment, a payload may serve as a compartment that can hold one or more items, such that a UAV 700 can deliver the one or more items to a target delivery location. For example, as shown in FIG. 6A, the UAV 600 can include a compartment 608, in which an item or items may be transported. As another example, the UAV 700 can include a pick-and-place mechanism, which can pick up and hold the item while the UAV 700 is in flight, and then release the item during or after the UAV's descent. As yet another example, the UAV 700 could include an air-bag drop system, a parachute drop system, and/or a winch system that is operable to drop or lower an item or items to a delivery location. Other examples are also possible. In some implementations, the payload of the UAV 700 may include or take the form of a "package" designed to transport medical-support items to a target delivery location. For example, a medical-support UAV may include a package with one or more items for medical support in the particular medical situation, and/or one or more medical-support modules that are designed to provide medical support in the particular medical situation. In some cases, a UAV 700 may include a package that is designed for a particular medical situation such as choking, cardiac arrest, shock, asthma, drowning, etc. In other cases, a UAV 700 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 724 for power.

In some embodiments, UAV 700 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, UAV 700 might function as a mobile defibrillator. Specifically, rather than carry a stand-alone defibrillator that can then be removed from the UAV for use, the UAV itself may function as a defibrillator.

G. Service Modules

As noted above, UAV 700 may include one or more service modules. The one or more service modules may include software, firmware, and/or hardware that may help to provide or assist in the provision of the UAV-related services. In some examples, the one or more service modules described herein may be implemented, at least in part, by the program instructions 714 configured to be executed by the processor(s) 718.

Configured as such, a UAV 700 may provide various types of service. For instance, the UAV 700 may have stored information that can be provided to a person or persons at the target location, in order to assist the person or persons in various ways. For example, the UAV 700 may include a video or audio file with instructions for performing some task, which the UAV 700 can play out to a person at the target location. As another example, the UAV 700 may include an interactive program to assist a person at the target location in performing some task. For instance, the UAV 700 may include an application that analyzes the person's speech to detect questions related to the medical situation and/or that provides a text-based interface via which the person can ask such questions, and then determines and provides answers to such questions.

In some embodiments, UAV 700 may facilitate communication between a layperson and/or medical personnel at the scene and medical personnel at a remote location. As an example, a service module may provide a user interface via which a person at the scene can use a communication system 710 of the UAV to communicate with an emergency medical technician at a remote location. As another example, the UAV 700 can unlock certain capabilities of a remote device, such as a mobile phone, which is near the UAV 700 at the scene of a medical situation. Such capabilities may be inaccessible to a user of the remote device, unless the remote device is within a certain distance from the UAV 700 such that the UAV 700 can unlock the capabilities. For example, the UAV 700 may send the remote device a security key that allows the remote device to establish a secure connection to communicate with medical personnel at a remote location. Other examples are also possible.

VIII. Example UAV Systems

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 8 is a simplified block diagram illustrating a distributed UAV system 800, according to an example embodiment.

In an example UAV system 800, an access system 802 may allow for interaction with, control of, and/or utilization of a network of UAVs 804. In some embodiments, an access system 802 may be a computing system that allows for human-controlled dispatch of UAVs 804. As such, the control system may include or otherwise provide a user interface (UI) 803 via which a user can access and/or control UAVs 804. In some embodiments, dispatch of UAVs 804 may additionally or alternatively be accomplished via one or more automated processes. The access system 802 and associated UI 803 that allow for human-controlled dispatch may be implemented, for example, using a remote terminal for supervisory control that provides information to a human operator (e.g., a video stream from one of the UAVs 804), and receives an input from the remote operator to indicate an action to be performed by the UAV 804.

Further, the access system 802 may provide for remote operation of a UAV. For instance, an access system 802 may allow an operator to control the flight of a UAV 804 via user interface 803. As a specific example, an operator may use an access system to dispatch a UAV 804 to deliver a package to a target location. The UAV 804 may then autonomously navigate to the general area of the target location. At this point, the operator may use the access system 802 to take over control of the UAV 804, and navigate the UAV to the target location (e.g., to a particular person to whom a payload is being sent). Other examples of remote operation of the UAV 804 are also possible.

The UAVs 804 may take various forms. For example, each UAV 804 may be a UAV such as those illustrated in FIGS. 6A-6D. However, UAV system 800 may also utilize other types of UAVs without departing from the scope of the present disclosure. In some implementations, all UAVs 804 may be of the same or a similar configuration. However, in other implementations, UAVs 804 may include a number of different types of UAVs. For instance, UAVs 804 may include a number of types of UAVs, with each type of UAV being configured for a different type or types of medical support.

A remote device 806 may take various forms. Generally, a remote device 806 may be any device via which a direct or indirect request to dispatch UAV 804 can be made. (Note that an indirect request may involve any communication that may be responded to by dispatching a UAV; e.g., requesting a payload delivery). In an example embodiment, a remote device 806 may be a mobile phone, tablet computer, laptop computer, personal computer, or any network-connected computing device. Further, in some instances, remote device 806 may not be a computing device. As an example, a standard telephone, which allows for communication via plain old telephone service (POTS), may serve as a remote device 806. Other types of remote devices are also possible.

Further, a remote device 806 may be configured to communicate with access system 802 via one or more types of communication network(s). For example, a remote device 806 could communicate with access system 802 (or via a human operator of the access system) by placing a phone call over a POTS network, a cellular network, and/or a data network such as the Internet. Other types of networks may also be utilized.

In some embodiments, a remote device 806 may be configured to allow a user to request delivery of one or more items to a desired location. For example, a user could request UAV delivery of a payload to their home via their mobile phone, tablet, or laptop. As another example, a user could request dynamic delivery to whatever location they are at the time of delivery. To provide such dynamic delivery, the UAV system 800 may receive location information (e.g., GPS coordinates, etc.) from the user's mobile phone, or any other device on the user's person, such that the UAV 804 can navigate to the user's location (as indicated by their mobile phone).

In an example arrangement, central dispatch system 808 may be a server or group of servers, which is configured to receive dispatch messages requests and/or dispatch instructions from an access system 802. Such dispatch messages may request or instruct the central dispatch system 808 to coordinate the deployment of UAVs to various target locations. A central dispatch system 808 may be further configured to route such requests or instructions to local dispatch systems 810. To provide such functionality, central dispatch system 808 may communicate with access system 802 via a data network, such as the Internet or a private network that is established for communications between access systems and automated dispatch systems.

In the illustrated configuration, central dispatch system 808 may be configured to coordinate the dispatch of UAVs 804 from a number of different local dispatch systems 810. As such, central dispatch system 808 may keep track of which UAVs 804 are located at which local dispatch systems 810, which UAVs 804 are currently available for deployment, and/or which services or operations each of the UAVs 804 is configured for (in the event that a UAV fleet includes multiple types of UAVs configured for different services and/or operations). Additionally or alternatively, each local dispatch system 810 may be configured to track which of its associated UAVs 804 are currently available for deployment and/or which services or operations each of its associated UAVs is configured for.

In some cases, when central dispatch system 808 receives a request for UAV-related service from an access system 802, central dispatch system 808 may select a specific UAV 804 to dispatch. The central dispatch system 808 may accordingly instruct the local dispatch system 810 that is associated with the selected UAV to dispatch the selected UAV. The local dispatch system 810 may then operate its associated deployment system 812 to launch the selected UAV. In other cases, a central dispatch system 808 may forward a request for a UAV-related service to a local dispatch system 810 that is near the location where the support is requested, and leave the selection of a particular UAV 804 to the local dispatch system 810.

In an example configuration, a local dispatch system 810 may be implemented in a computing system at the same location as the deployment system or systems 812 that it controls. For example, in some embodiments, a local dispatch system 810 could be implemented by a computing system at a building where the deployment systems 812 and UAVs 804 that are associated with the particular local dispatch system 810 are also located. In other embodiments, a local dispatch system 810 could be implemented at a location that is remote to its associated deployment systems 812 and UAVs 804.

Numerous variations on and alternatives to the illustrated configuration of UAV system 800 are possible. For example, in some embodiments, a user of a remote device 806 could request medical support directly from a central dispatch system 808. To do so, an application may be implemented on a remote device 806 that allows the user to provide information regarding a requested service, and generate and send a data message to request that the UAV system provide the service. In such an embodiment, central dispatch system 808 may include automated functionality to handle requests that are generated by such an application, evaluate such requests, and, if appropriate, coordinate with an appropriate local dispatch system 810 to deploy a UAV.

Further, in some implementations, some or all of the functionality that is attributed herein to central dispatch system 808, local dispatch system(s) 810, access system 802, and/or deployment system(s) 812 could be combined in a single system, implemented in a more complex system, and/or redistributed among central dispatch system 808, local dispatch system(s) 810, access system 802, and/or deployment system(s) 812 in various ways.

Yet further, while each local dispatch system 810 is shown as having two associated deployment systems, a given local dispatch system 810 may have more or less associated deployment systems. Similarly, while central dispatch system 808 is shown as being in communication with two local dispatch systems 810, a central dispatch system may be in communication with more or less local dispatch systems 810.

In a further aspect, a deployment system 812 may take various forms. In general, a deployment system may take the form of or include a system for physically launching a UAV 804. Such a launch system may include features that allow for a human-assisted UAV launch and/or features that provide for an automated UAV launch. Further, a deployment system 812 may be configured to launch one particular UAV 804, or to launch multiple UAVs 804.

A deployment system 812 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 812 and their corresponding UAVs 804 (and possibly associated local dispatch systems 810) may be strategically distributed throughout an area such as a city. For example, deployment systems 812 may be located on the roofs of certain municipal buildings, such as fire stations, which can thus serve as the dispatch locations for UAVs 704. Fire stations may function well for dispatch of emergency response UAVs (e.g., UAVs used to delivery emergency medical supplies, relief items, or interactive equipment to assist people in responding to an emergency situation). Fire stations tend to be distributed well with respect to population density, their roofs tend to be flat, and the use of firehouse roofs as leased spaces for dispatch of emergency response UAVs could further the public good. However, deployment systems 812 (and possibly the local dispatch systems 810) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 800 may include or have access to a user-account database 814. The user-account database 814 may include data for a number of user-accounts, which are each associated with one or more persons. For a given user-account, the user-account database 814 may include data related to or useful in providing UAV-related services. Typically, the user data associated with each user-account is optionally provided by an associated user and/or is collected with the associated user's permission.

Further, in some embodiments, a person may have to register for a user-account with the UAV system 800 in order to use or be provided with UAV-related services by the UAVs 804 of UAV system 800. As such, the user-account database 814 may include authorization information for a given user-account (e.g., a user-name and password), and/or other information that may be used to authorize access to a user-account.

In some embodiments, a person may associate one or more of their devices with their user-account, such that they can be provided with access to the services of UAV system 800. For example, when a person uses an associated mobile phone, e.g., to place a call to an operator of access system 802 or to send a message requesting a UAV-related service to a dispatch system, the phone may be identified via a unique device identification number, and the call or message may then be attributed to the associated user-account. Other examples are also possible.

In some examples, an individual user or a group of users may create a data-based "user-account," which may also be referred to simply as an "account." A user-account for a particular user or user group may include data related to the particular user or user group, which the user or user group has opted to provide for the user-account. As such, a particular user's account may, in a sense, be a data-based representation of that particular user. A user may create an account for various applications, web sites, and/or online services, for instance. Examples of user accounts include e-mail accounts, social network accounts, online financial accounts, accounts with service providers, among other possibilities. Further, in some cases, a user may have a single user-account that provides as a data-based representation of the user for multiple services, websites, applications, etc. For instance, a user could opt to use their e-mail account or social network account as a common login for various online services and applications, which are provided by a number of different entities. Further, a user of a computing device, such as a mobile phone, laptop computer, or wearable computing device, may associate their user-account with the computing device itself, such that while the user is operating the computing device, their account will be associated with applications that are provided on the computing device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content serer that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

IX. Conclusion

Where example embodiments involve information related to a person or a device of a person, the embodiments should be understood to include privacy controls. Such privacy controls include, at least, anonymization of device identifiers, transparency and user controls, including functionality that would enable users to modify or delete information relating to the user's use of a product.

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A system comprising:
  a retractable delivery system comprising:
    (i) a delivery device configured to be releasably coupled to a payload;
    (ii) a tether coupled to an unmanned aerial vehicle (UAV) and the delivery device; and
    (iii) a retraction system coupled to the tether and operable to use the tether to lower the delivery device and the payload secured thereby from the UAV;
  an air propulsion system situated on the delivery device, wherein the air propulsion system is configured to, while the delivery device is suspended from the UAV via the tether, generate force on the delivery device in a direction at least partially transverse to a direction of the tether near the delivery device; and
  a control system configured to:
    (i) while the delivery device is suspended from the UAV via the tether, determine a position of the delivery device with respect to a path of descent associated with a delivery location;
    (ii) determine a movement to be performed by the delivery device so as to move the delivery device closer to the path of descent; and
    (iii) use the air propulsion system to cause the delivery device to perform the determined movement.

2. The system of claim 1, wherein the air propulsion system comprises a thruster mounted to the delivery device so as to generate thrust directed at least partially transverse to the direction of the tether near the delivery device.

3. The system of claim 2, wherein the thruster comprises a propeller.

4. The system of claim 1, wherein the air propulsion system comprises an airfoil mounted to the device, wherein the airfoil is configured to move between a first position and a second position, wherein the first and second positions of the airfoil cause the airfoil to interact with the surrounding air so as to generate respective forces on the delivery device that are at least partially transverse to the direction of the tether near the delivery device.

5. The system of claim 1, wherein the control system is further configured to:
  (iv) while the UAV hovers over the delivery location, use the retractable delivery system to initiate a delivery operation, wherein initiating the delivery operation comprises lowering the delivery device and the payload secured thereby toward the ground such that the payload descends from the UAV;
  (v) determine that the delivery device is at or near the ground; and
  (vi) in response to determining that the delivery device is at or near the ground, release the payload from the delivery device.

6. The system of claim 1, wherein the control system is further configured to:

(iv) determine, based at least in part on the determined position of the delivery device with respect to the path of descent associated with the delivery location, flight-control commands to navigate the UAV, in hover mode, so as to cause the suspended delivery device to become closer to the path of descent associated with the delivery location; and
  (v) cause the UAV to fly, in hover mode, in accordance with the determined flight-control commands.

7. The system of claim 1, wherein the control system is further configured to: prior to using the air propulsion system to cause the delivery device to perform the determined movement, determine that the delivery device is separated from the path of descent associated with the delivery location by greater than a threshold distance.

8. The system of claim 1, further comprising:
  at least one sensor situated on or within the delivery device, wherein the at least one sensor is configured to generate sensor data indicative of a position of the delivery device; and
  wherein the control system is further configured to receive sensor data from the at least one sensor and base the determination of the position of the delivery device with respect to the path of descent associated with the delivery location at least partially on the received sensor data.

9. The system of claim 1, further comprising:
  an imaging system mounted to the UAV, wherein the imaging system is situated such that, while the delivery device is suspended from the UAV via the tether, a field of view of the imaging system includes the suspended delivery device; and
  wherein the control system is further configured to use the imaging system to obtain image data and base the determination of the position of the delivery device with respect to the path of descent associated with the delivery location at least partially on the obtained image data.

10. The system of claim 1,
  wherein the delivery device comprises: (i) a housing having a channel configured to receive a payload mount attachment of a payload, and (ii) a retaining rod mounted to the housing, wherein the retaining rod is configured to be positioned in a first position in which at least a portion of the retaining rod intersects respective planes defined by opposing sidewalls of the channel, and a second position in which the retaining rod does not intersect at least one of the respective planes.

11. A method comprising:
  while a delivery device is suspended from an unmanned aerial vehicle (UAV) via a tether, determining a position of the delivery device with respect to a path of descent associated with a delivery location;
  determining a movement to be performed by the delivery device so as to move the delivery device closer to the path of descent; and
  using an air propulsion system generate force on the delivery device in a direction at least partially transverse to a direction of the tether, to thereby cause the delivery device to perform the determined movement, wherein the air propulsion system is situated on the delivery device.

12. The method of claim 11, further comprising, prior to using the air propulsion system to cause the delivery device to perform the determined movement, determining that the delivery device is separated from the path of descent associated with the delivery location by greater than a threshold distance.

13. The method of claim 11, wherein determining the position of the delivery device with respect to the path of descent associated with the delivery location comprises:
receiving image data from an imaging system, wherein the imaging system is mounted on the UAV such that, while the delivery device is suspended from the UAV via the tether, a field of view of the imaging system includes a light source situated on the delivery device;
identifying, based on the received image data, an image coordinate associated with the light source situated on the delivery device; and
determining, based at least in part on the identified image coordinate, a position of the delivery device.

14. The method of claim 11, further comprising:
while the UAV hovers over a delivery location, using a retractable delivery system to initiate a delivery operation, wherein initiating the delivery operation comprises lowering the delivery device and the payload secured thereby toward the ground such that the payload descends from the UAV;
determining that the delivery device is at or near the ground; and
in response to determining that the delivery device is at or near the ground, releasing the payload from the delivery device.

15. The method of claim 11, further comprising:
determining, based at least in part on the determined position of the delivery device with respect to the path of descent associated with the delivery location, flight-control commands to navigate the UAV, in hover mode, so as to cause the suspended delivery device to become closer to the path of descent associated with the delivery location; and
causing the UAV to fly, in hover mode, in accordance with the determined flight-control commands.

16. The method of claim 15, wherein determining the flight-control commands comprises:
determining a translational offset of the UAV which compensates for a displacement between the determined position of the delivery device and the path of descent associated with the delivery location; and
using a navigational module to determine the flight-control commands which cause the UAV to traverse the determined translational offset in hover mode.

17. A delivery device comprising:
a housing comprising a tether anchor configured to couple the housing to a tether operable to suspend the housing from an unmanned aerial vehicle (UAV) via the tether;
an electromechanical component mounted to the housing, wherein the electromechanical component is configured to be positioned in: (i) a first position in which the electromechanical component engages a payload so as to secure the payload to the housing, and (ii) a second position in which the electromechanical component does not engage the payload;
an air propulsion system mounted to the housing, wherein the air propulsion system is configured to, while the delivery device is suspended from the UAV via the tether, generate force on the delivery device in a direction at least partially transverse to a direction of the tether near the delivery device; and
a control system configured to:
(i) while the delivery device is suspended from the UAV via the tether, determine a position of the delivery device with respect to a path of descent associated with a delivery location;
(ii) determine a movement to be performed by the delivery device so as to move the delivery device closer to the path of descent; and
(iii) use the air propulsion system to cause the delivery device to perform the determined movement.

18. The delivery device of claim 17, wherein the air propulsion system comprises a thruster mounted to the housing so as to generate thrust directed at least partially transverse to the direction of the tether near the delivery device.

19. The delivery device of claim 17, wherein the air propulsion system comprises an airfoil mounted to the housing, wherein the airfoil is configured to move between a first position and a second position, wherein the first and second positions of the airfoil cause the airfoil to interact with the surrounding air so as to generate respective forces on the delivery device that are at least partially transverse to the direction of the tether near the delivery device.

20. The delivery device of claim 17, wherein the control system is further configured to:
(iv) while the UAV hovers over the delivery location, use the retractable delivery system to initiate a delivery operation, wherein initiating the delivery operation comprises lowering the delivery device and the payload secured thereby toward the ground such that the payload descends from the UAV;
(v) determine that the delivery device is at or near the ground; and
(vi) in response to determining that the delivery device is at or near the ground, release the payload from the delivery device.

* * * * *